(12) United States Patent
Szymborski et al.

(10) Patent No.: US 6,371,488 B1
(45) Date of Patent: Apr. 16, 2002

(54) SEALING SYSTEM FOR HIGH PRESSURE CLOSED SYSTEMS HAVING A ROTATING MEMBER AND A HOUSING THEREIN

(76) Inventors: George E. Szymborski, 2124 Griffith St., Philadelphia, PA (US) 19152; Richard A. Jones, 35 Summit Grove Ave., Bryn Mawr, PA (US) 19010

( * ) Notice: Subject to any disclaimer, the term of this patent is extended or adjusted under 35 U.S.C. 154(b) by 0 days.

(21) Appl. No.: 09/466,247

(22) Filed: Dec. 17, 1999

(51) Int. Cl.[7] ................................. F16J 15/34

(52) U.S. Cl. ................ 277/365; 277/358; 277/370

(58) Field of Search ............................ 277/358, 361, 277/364, 365, 370

(56) References Cited

U.S. PATENT DOCUMENTS

| | | | | |
|---|---|---|---|---|
| 5,172,918 A | * | 12/1992 | Pecht et al. | 277/358 |
| 5,217,233 A | * | 6/1993 | Pecht et al. | 277/358 |
| 5,509,664 A | * | 4/1996 | Borkiewicz | 277/400 |
| 5,516,118 A | * | 5/1996 | Jones | 277/361 |
| 6,145,843 A | * | 11/2000 | Hwang | 277/400 |

* cited by examiner

*Primary Examiner*—Anthony Knight
*Assistant Examiner*—E. Peavey
(74) *Attorney, Agent, or Firm*—Zigmund L. Dermer

(57) ABSTRACT

A seal system for a motor pump unit includes a primary and a plurality of backup seals mounted in series within a seal housing. The primary seal is of a hydrostatic type and each of the backup seals is of a normally closed hydrodynamic type. Each of the primary and backup seals has a secondary seal between an axially movable seal ring thereof and the fixed seal housing, and at least one of these secondary seals is a spring-loaded, split piston ring seal. Two of the backup seals are of the Rayleigh type, where the Rayleigh pockets are formed in the seal runner, and the sealing dam is formed on the axially movable seal ring. An insert is provided in the runner of one of the backup seals, which insert is formed from a relatively harder material than the material forming the sealing dam. The other Rayleigh-type backup seal has pumping grooves extending downwardly and inwardly through the runner and toward the shaft to pump liquid into the Rayleigh pockets to ensure proper seal operation. A segmented backup shutdown seal is also provided, upstream of the two previously mentioned backup seals, which has pockets therein that pump any leakage back into the seal housing, yet in the unlikely event full system pressure appears across the segmented shutdown seal, that pressure will turn the shutdown seal into a rubbing seal with higher wear and prevent leakage from the seal housing. The seal system is designed so that the two Rayleigh-type backup seals may be mounted on a removable shaft sleeve and are removable as a unit by a single lift of the shaft sleeve. The shutdown seal is formed from two half-ring subassemblies, which are secured together and to the seal housing. The shutdown seal may be removed by disengaging the two subassemblies from the seal housing and from each other, so that the shaft need not be decoupled from its driver in the event of inspection or replacement of the shutdown seal.

16 Claims, 9 Drawing Sheets

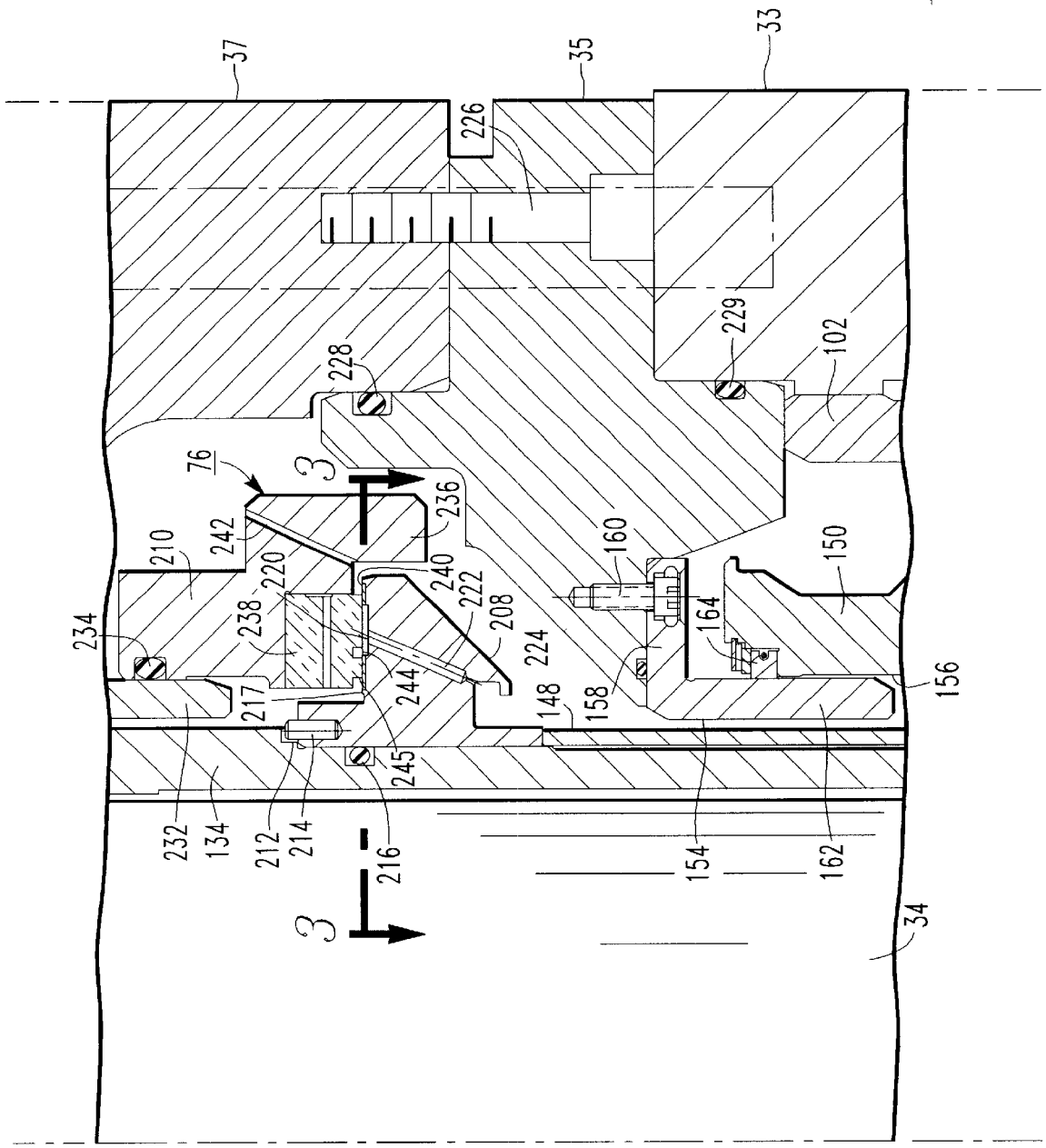

SEALING SYSTEM FOR HIGH PRESSURE CLOSED SYSTEMS HAVING A ROTATING MEMBER AND A HOUSING THEREIN

CROSS REFERENCE TO RELATED PATENTS

Reference is hereby made to the following Letters Patent dealing with the subject matter related to this invention.
1. U.S. Pat. No. 3,347,552, issued Oct. 17, 1967, titled "Controlled Leakage Face-Type Seals," by E. Frisch
2. U.S. Pat. No. 3,522,948, issued Aug. 4, 1970, titled "Variable Flow Path Seal," by A. N. MacCrum
3. U.S. Pat. No. 4,082,296, issued Apr. 14, 1978, titled "Seals for Sealing Between a Rotating Member and a Housing," by Philip C. Stein
4. U.S. Pat. No. 4,961,678, issued Oct. 9, 1990, titled "Reactor Coolant Pump Having Double Dam Seal with Self-Contained Injection Pump Mechanism," by David J. Janocko
5. U.S. Pat. No. 5,071,318, issued Dec. 10, 1991, titled "Reactor Coolant Pump Having Improved Dynamic Secondary Seal Assembly," by Charles D. Bice et al.

BACKGROUND OF THE INVENTION

1. Field of the Invention

The present invention relates generally to sealing systems for effecting a seal between a shaft operating in a closed high pressure system and a housing, and is more particularly concerned with shaft seals employed in extremely high pressure systems such as in a main coolant pump used in a nuclear power plant.

2. Description of the Prior Art

In pressurized water nuclear power plants a reactor coolant is used to transport heat from the reactor core to steam generators for the production of steam. The steam is then used to drive a turbine generator and produce electricity. The reactor coolant system includes a plurality of separate cooling loops, each connected to the reactor core and containing a steam generator and a reactor coolant pump. Systems of this type normally operate at pressures in excess of 1000 psi; in a pressurized water nuclear power plant, the system pressure during operation is significantly in excess of 1000 psi.

A reactor coolant pump typically is a vertical, single stage, centrifugal pump, designed to move large volumes of reactor coolant at high temperatures and pressures—for example, 550° F. and up to 2500 psi. The pump basically includes an intermediate hydraulic shaft seal section located between a lower hydraulic impeller section and an upper motor section. The lower hydraulic section includes an impeller mounted on the lower end of a pump shaft which is operable within a pump casing to pump reactor coolant around the respective loop. The upper motor section includes a motor which is coupled to and drives the pump shaft.

Above the hydraulic section are an internal thermal barrier and external cooling coils which serve to cool system liquid passing therealong. Above the thermal barrier there may be additional clean liquid injected into the housing which is at lower temperature and therefore isolated from the system temperature by the thermal barrier and cooling coils. Sleeve bearings are also provided for the motor and pump shafts, as well as appropriate thrust bearings for the latter, none of which form a part of this invention.

In accordance with the prior art, the intermediate or shaft seal section includes a plurality of vertically separated tandem sealing assemblies, more particularly a primary sealing assembly located at the lower end of the shaft adjacent to and above the pump casing; above the latter is the secondary (back-up) sealing assembly; and above the latter is an upper or tertiary sealing assembly. The sealing assemblies are located concentric to and near the top end of the pump shaft and in a housing which is positioned above the pump impeller. Their combined purpose is to mechanically contain the high positive pressure coolant of the reactor cooling system to prevent leakage along the pump shaft to the reactor containment during both normal and abnormal operating conditions.

The lower, primary sealing assembly is the main seal of the pump. It is typically a hydrostatic, radially tapered, "film-riding," controlled-leakage seal, whose primary components are an annular runner which rotates with the pump shaft and a non-rotating annular seal ring which is sealingly mounted to the housing of the lowest seal assembly. The initial design of such a primary seal is described in the afore-mentioned cross-referenced U.S. Pat. No. 347,552 of E. Frisch and has been subsequently modified in its details by, for example, U.S. Pat. No. 3,522,948 of A. N. MacCrum, also referred to above. The primary (or No. 1) seal causes a pressure drop of coolant water from about 2250 psi to 30–50 psi across its face. It allows a flow-rate of 1–3 gallons per minute therethrough. The liquid coolant leaking through the No. 1 seal, now normally at a much lower pressure, flows up the upwardly extending shaft and within the seal housing to a region of the middle, or back-up, sealing assembly. The latter sealing assembly (or No. 2 seal), in accordance with the prior art, has been a rubbing face-type seal. Its primary components have been a rotating runner having an upwardly facing sealing surface and a non-rotating, axially mounted ring located above the runner. During normal operation, this ring and runner provide a rubbing seal. In the unlikely event of No. 1 seal failure, however, the distribution of pressure on the No. 2 seal ring and runner causes them to act as springs and to deflect around their respective centroids, the ring deflecting in a counterclockwise direction and the seal runner deflecting in a clockwise direction, in such a way as to create the converging gap of a hydrostatic, film-riding, face-type seal. In accordance with the prior art (see U.S. Pat. No. 4,961,678, Column 2), as a film-riding face-type seal, the No. 2 seal has the entire high system pressure across it during this emergency condition. During normal operation, however, much of the No. 1 seal leak-off is diverted to a leak-off system. The remaining portion of the coolant passes through the No. 2 seal, leaking at a flow rate of approximately 2 gallons per hour at a pressure across the No. 2 seal of about 30 psi on the higher pressure (inlet) end, which is reduced by the No. 2 seal to 3–7 psi on the lower pressure (outlet) end. The still lower-pressure coolant water leaking through the No. 2 seal flows farther up the shaft and through a region of the upper tertiary (No. 3) sealing assembly.

In accordance with the prior art, the upper or tertiary sealing assembly (or No. 3 seal) has been a rubbing face-type seal, its primary components also being a rotating runner and an axially movable, non-rotating ring. Most of the flow leaking from the No. 2 seal is diverted by the No. 3 seal out through the No. 2 seal leak-off. The rubbing face-type No. 3 seal has been in one of two forms: either it has a double dam seal with two concentric sealing faces, or it has a single dam. The normal, minimal leakage from the No. 3 seal is designed to pass through a No. 3 leak-off system to the containment atmosphere, a situation that reactor systems designers would like to avoid, if possible.

In many nuclear power plants, a material which suppresses neutrons is dissolved into the reactor coolant water.

This is normally boric acid enriched with $B^{10}$ isotope, which acts as the neutron suppressor. The amount of boric acid that can be retained in the reactor system coolant is pressure and temperature dependent. Thus, when the pressure in a reactor system region drops such as occurs across the No. 1, No. 2, and No. 3 seals, the amount of dissolved boric acid in the coolant frequently may not be totally retained in the coolant; thus it may precipitate out into the seal gap to interfere with the effective closing of the seal. To prevent this occurrence, the additional liquid injected into the seal region is intentionally boron-free; because the area of contact between the system liquid and this additional liquid is so small, only a minimal amount of dissolved boron in the system liquid will mix with the added clean liquid.

While it is highly unlikely that there will be a failure of the No. 1 seal, a proposed failure is postulated for safety review purposes by the regulators of nuclear power plants. Thus it is important that back-up systems be provided for this unlikely event. Similarly, it is unlikely that the No. 2 seal could fail either by itself or concurrently with the No. 1 seal; that event, however, is also a postulated safety event and the No. 3 seal is provided to accommodate a breakdown of the No. 2 seal alone. In the event both the No. 1 and No. 2 seals fail, either concurrently or in sequence, while the plant is still under pressure, the No. 3 seal will be required to accommodate full system pressure thereacross. As will be discussed, it is an objective of this invention to provide for a back-up sealing arrangement which can accommodate full system pressure in the highly unlikely event that Nos. 1 and 2 seals fail at the same time, which event may be postulated, nonetheless, by certain regulatory bodies.

Another significant requirement of reactor coolant systems is that the seal systems operate for long periods of time between reactor core refuelings and not be the cause of shutdown of the plant. However, during reactor refueling, seal maintenance is a critical path item. It must be performed with such speed that the down time for seal maintenance is no greater than the time necessary for other maintenance and for reactor core refueling. Thus a reduction of maintenance or change-out time for the primary and back-up seals to ensure that seal maintenance does not increase the critical time path for plant maintenance is an important objective of all seal systems.

A further significant requirement of seal systems is to minimize if not totally prevent the leakage of primary coolant fluid through the seal into the reactor containment, in the unlikely event of seal failure. In accordance with prior art systems, this is accomplished by reliance on a leak-off system adjacent to the back-up sealing arrangement; however, an arrangement which ensures that seal leakage will not occur irrespective of whether or not the pump shaft is rotating at the time of purported failure of the No. 1 or the No. 2 seal, separately or concurrently, is an important objective of this invention.

Another objective is to provide, as the back-up (No. 3) sealing arrangement for normal low-pressure operation, a hydrodynamic, Rayleigh-type face seal upstream of the No. 2 seal, the main back-up seal. A No. 3 seal of the Rayleigh type, which is normally biased closed when the shaft is stationary, is desirable for the sealing system. Furthermore, with low pressure on the upstream side of the No. 3 seal in a main coolant pump where the pump shaft is normally vertically disposed, coupled with possible gas build-up in the sealing gap and with the presence of leak-off systems between the No. 2 and No. 3 seals, there could well result a liquid level below the inlet of a Rayleigh-type No. 3 seal gap or a gas pocket at that inlet. In this event, the Rayleigh-type seal would be running dry and would thereby quickly wear. It is an objective of this invention to provide a Rayleigh-type seal wherein the dry operation thereof during normal operating conditions is significantly reduced.

Field experiences with No. 1 and No. 2 seals have been discussed in Bice et al., U.S. Pat. No. 5,071,315, wherein the use of simple O-rings (together with Teflon inserts) on the secondary sealing face of each of the No. 2 and No. 3 seals may cause problems, particularly if the O-ring moves from its retaining groove and becomes jammed between the seal ring and the adjacent stationary housing part. In that event the axial movement of the seal ring toward and away from its runner surface may be impeded, and a seal ring may well be "hung up" so that the seal gap does not close the normal axial height. In that case the expected pressure drop across the seal gap may not occur, and the system pressure, or a large part thereof, may be exposed to the high pressure side of the next upstream seal. It is another objective of this invention to reduce the possibility of such occurrences.

SUMMARY OF THE INVENTION

The above-mentioned objectives of this invention are accomplished cooperatively and severally in the preferred embodiment by the provision of a new and improved sealing arrangement for the main coolant pumps of a nuclear reactor system. As in the prior art, the primary seal may include a tapered face-type, film-riding, hydrostatic seal ring which breaks down pressure in excess of 1000 psi to approximately 30–50 psi (it being understood that all pressures mentioned in this specification are pressures above atmospheric pressure and therefore gauge pressures). The primary seal ring is movable within limits toward and away from a rotatable primary seal runner surface. The primary seal ring also includes a secondary seal thereon which utilizes the combination of a stationary annular seal housing liner with a generally L-shaped cross section closely received within the seal ring, and an in-line seal such as a normal annular O-ring (with or without a Teflon insert cooperatively mounted therewith) disposed on the seal ring and engaging the housing liner. Thus the only fluid flow path between the primary seal ring and the pressurized housing in which it is located is along the gap between the radially disposed sealing face on the primary seal runner and the complementary sealing face on the axially movable hydrostatic annular sealing ring. It will be noted that in a nuclear power plant the system pressure during normal operation is on the order of 2250 psi.

The invention provides a plurality of back-up seals mounted in fluid series with the primary or No. 1 seal and will be referred to herein as the No. 2, No. 3, and No. 4 seals, all of which perform a back-up function for the No. 1 seal. In accordance with the invention, the No. 2 seal constitutes a face-type annular seal ring which is mounted to move axially toward and away from a sealing surface on a radially disposed seal runner. The No. 2 seal, in accordance with the invention, is a hydrodynamic seal and includes a plurality of Rayleigh-type grooves or pockets mounted in the runner surface, rather than in the ring surface, with the Rayleigh-type pockets being formed in an insert preferably made from silicon nitride, which insert is mounted on the metallic seal runner. The sealing ring is desirably metal and also includes an insert which is normally separated from the seal surface of the runner by a fluid-containing seal gap and is desirably formed of a carbon or carbide compound. The No. 2 seal is provided with a secondary seal assembly which utilizes the combination of an annular liner with a modified L-shaped cross section as part of the housing; however, the secondary seal for the No. 2 seal is a piston-ring arrangement, rather than an O-ring arrangement, which seals between the sealing ring and the housing liner. The hydrodynamic No. 2 seal operates such that a sealing gap is created only when the shaft is rotating; otherwise, when the shaft is stationary, the No. 2 seal gap is forced to be totally closed.

This invention further teaches that the shaft is desirably provided with one or more removable cartridge sleeves mounted thereon located opposite the No. 2, 3, and 4 seals so that they are sealed thereto and held fixed in position. The cartridge sleeve(s) may be removed from the shaft by being lifted over its upper end The seal runners of the No. 2 and No. 3 seals are fixedly mounted on the outer surface of the sleeve(s) such that the removal of the sleeve(s) would include the removal of the entire No. 2, 3, or 4 seal as well as adjacent housing parts by a single lift, or possibly two lifts; and all of this apparatus can be replaced quickly by new (or refurbished) preassembled subassemblies to reduce maintenance time.

Downstream of the No. 2 seal is a No. 3 seal, which is mounted vertically above the No. 2 seal and includes a seal runner mounted on the afore-mentioned cartridge sleeve. The No. 3 sleeve also includes an annular seal ring which is mounted to cooperate with a stationary annular liner housing of the L-shaped cross section and has a sealing face thereon which opposes a radial sealing face on the seal runner. The radial sealing face on the seal ring moves with the seal ring toward and away from the sealing face on the seal runner in the axial direction, forming a seal gap of variable axial size. In this invention the No. 3 seal constitutes a hydrodynamic, Rayleigh-type seal wherein the Rayleigh-type pockets are formed in the seal runner and the seal ring has an insert made of carbon or a carbon-graphite combination which is mounted in the metallic seal ring. The hydrodynamic No. 3 seal is also designed to be normally closed to prevent all leakage along the seal gap when the shaft is stationary. The purpose of the No. 3 seal during normal operations, when the shaft is rotating, is to break down the 30–50 psig pressure on the downstream side of the No. 2 seal to a pressure of approximately 1–3 psig. While the pump system normally has a leak-off on the downstream side of the No. 2 seal below the No. 3 seal, it is possible (1) for the liquid level at the upstream side of the No. 3 seal to be below the seal gap, or (2) for gas pockets at the entrance of the seal gap to be formed, thus causing the No. 3 seal to run dry. In order to avoid this, the Rayleigh-type pockets in the No. 3 seal are formed in the seal runner together with pumping passageways which extend vertically downward from the lower surface of each of the Rayleigh pockets in the seal runner through the runner at a slight angle toward the centerline of the shaft. The passageways will pump into the pockets liquid which is at a level located below the bottom of the Rayleigh-type pockets in the seal runner, but above the lower end of the pumping passageways, thereby ensuring that the No. 3 seal runs with liquid in the pockets. Also, a gas drain may be formed in the No. 3 seal ring adjacent the seal gap inlet to prevent gas pocket formation. The No. 2 seal ring also has a gas drain formed on it in the same location as on the No. 3 seal.

This invention also provides a new back-up seal referred to herein as the No. 4 seal, located vertically above the No. 3 seal, which serves as a back-up and shutdown seal capable of preventing leakage of liquid (or even a mist) from the interior to the exterior of the pump casing irrespective of the pressure across the Nos. 1 to 4 seals and irrespective of the rotation of the pump shaft. This is accomplished by forming the No. 4 seal as a segmented ring seal which has its primary sealing surface co-acting with a vertically extending surface on the pump shaft. In this example the sealing surface on the pump shaft is formed on a cartridge sleeve which is sealingly mounted on the pump shaft to prevent leakage therebetween. The No. 4 seal, being a segmented type, during normal operation may comprise a rubbing seal having hydrodynamic means thereon for producing negative hydrodynamic lift in a sealing surface of the seal ring segments, in the event liquid reaches the No. 4 seal at higher than normal pressure or even with full system pressure across it For example, a seal of the type described in U.S. Pat. No. 4,082,296, issued to Philip C. Stein, serves well in this application. It will be noted that, in the unlikely event of failure of both the No. 1 and the No. 2 seals, total system pressure would appear across the No. 3 seal, which is formed to be completely closed when the shaft is stationary. Should the shaft be rotating at the time of the proposed failure, total system pressure would be across the No. 3 seal, which could not be totally broken down by the No. 3 seal even though some pressure breakdown would be achieved, and thus a good-sized portion of the full system pressure would extend to the inlet of and across the No. 4 seal. If very high system pressure appears across the No. 4 seal, it will serve to force the seal segments into contact with both the shaft sleeve sealing surface and the adjacent housing sealing surface, irrespective of whether or not the shaft is rotating, and thereby (for a significant length of time during which the reactor system will be shut down) prevent leakage from passing out of the interior of the pump housing.

These and other features and advantages of the present invention will become apparent to those skilled in the art upon a reading of the following detailed description when taken in conjunction with the drawings, wherein is shown and described an illustrative embodiment of this invention, it being understood that each of the improvements may be used separately without use of the other improvements, and such use remains within the contemplation of this invention.

BRIEF DESCRIPTION OF THE DRAWINGS

In the course of the following detailed description, reference will be made to the attached drawings in which:

FIGS. 2A, 2B, 2C and 2D, when placed end to end, form an enlarged sectional view through the seal portion of the motor pump unit of FIG. 1B, illustrating the shaft and the primary and back-up sealing systems for the pump.

DETAILED DESCRIPTION OF THE INVENTION

Figure 1A:
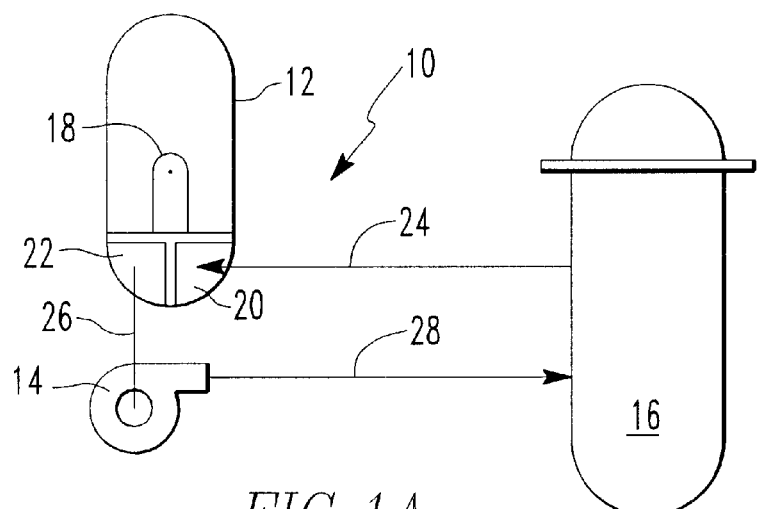
FIG. 1A is a schematic representation of one cooling loop of a conventional nuclear reactor cooling system, which includes a steam generator and a reactor coolant pump connected in series in a closed coolant flow circuit with the reactor core.

With reference now to the drawings, and particularly to FIG. 1A, there is shown a schematic representation of one of a plurality of cooling loops 10 of a conventional nuclear reactor coolant system of the pressurized water type. The cooling loop 10 includes a steam generator 12 and a reactor coolant pump 14 serially connected in a closed coolant flow circuit with a nuclear reactor core 16. The steam generator 12 includes primary tubes 18 communicating with inlet and outlet plenums 20 and 22 of the generator. The inlet plenum 20 of the steam generator 12 is connected in flow communication with the outlet of the reactor core 16 for receiving heated coolant therefrom along flow path 24 of the closed flow circuit. The outlet plenum 22 of the steam generator 12 is connected in flow communication with an inlet suction side of the reactor coolant pump 14 along flow path 26 of the closed flow circuit. The outlet pressure side of the reactor coolant pump 14 is connected in flow communication with the inlet of the reactor core 16 for feeding cold coolant thereto along flow path 28 of the closed flow circuit.

In brief, the reactor coolant pump 14 pumps the coolant under high pressure about the closed flow circuit. Particularly, hot coolant emanating from the reactor core 16 is conducted to the inlet plenum 20 of the steam generator 12 and to the primary tubes 18 in communication therewith. While in the primary tubes 18, the hot coolant flows in heat exchange relationship with cool feedwater supplied to the steam generator 12 via conventional means (not shown). The feedwater is heated and portions thereof changed to steam for use in driving a turbine generator (not shown). The coolant, whose temperature has been reduced by the heat exchange, is then recirculated to the reactor core 16 via the coolant pump 14.

The reactor coolant pump 14 must be capable of moving large volumes of reactor coolant at high temperatures and pressures about the closed flow circuit. Although the temperature of the coolant flowing from the steam generator 12 to the pump 14 after heat exchange has been cooled substantially below the temperature of the coolant flowing to the steam generator 12 from the reactor core 16 before heat exchange, its temperature is still relatively high, being typically about 500° F. The coolant pressure produced by the pump is typically about 2250 psi.

Figure 1B:
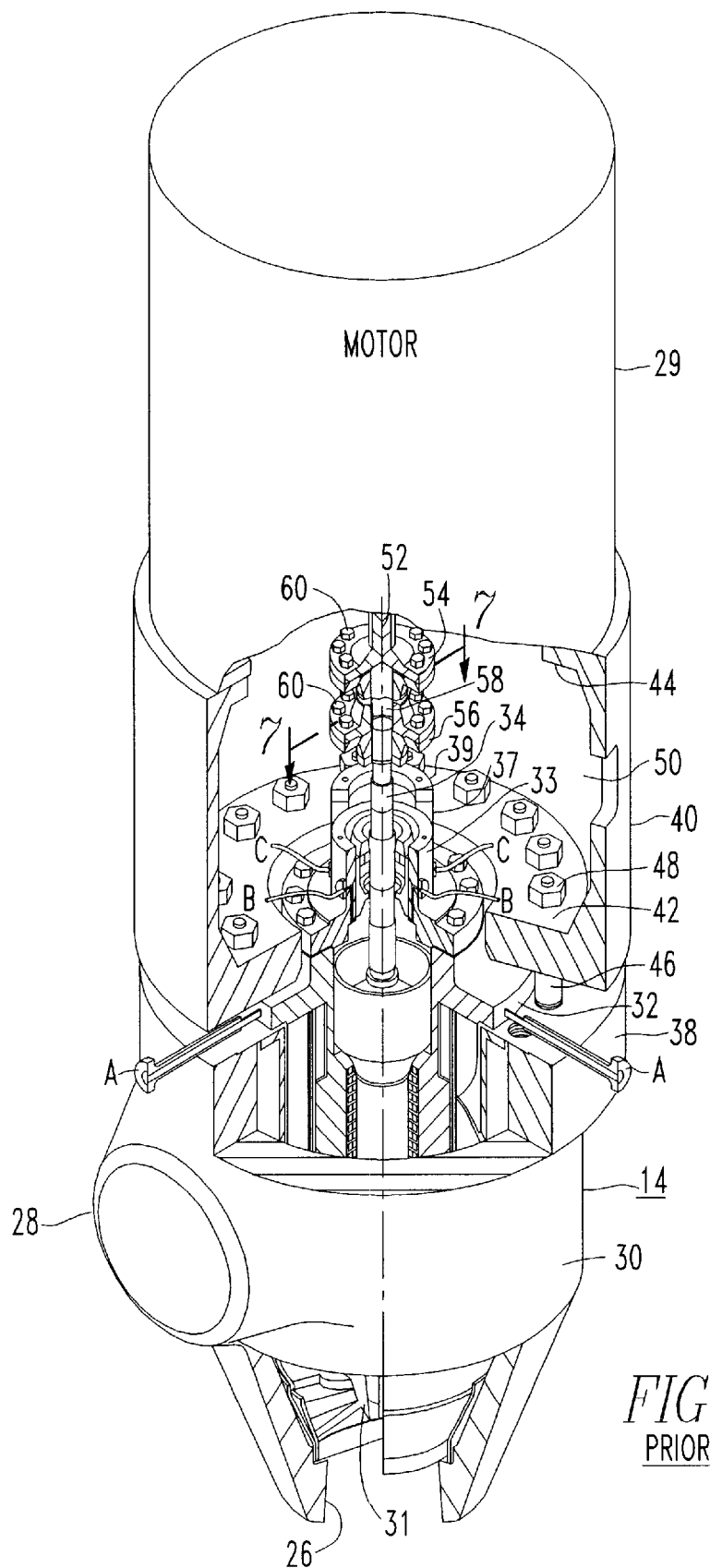
FIG. 1B is a view in perspective of a motor pump unit used with the reactor system of FIG. 1A and having parts thereof cut away and shown in section for clarity of understanding of the operation of this invention.
Figure 7:
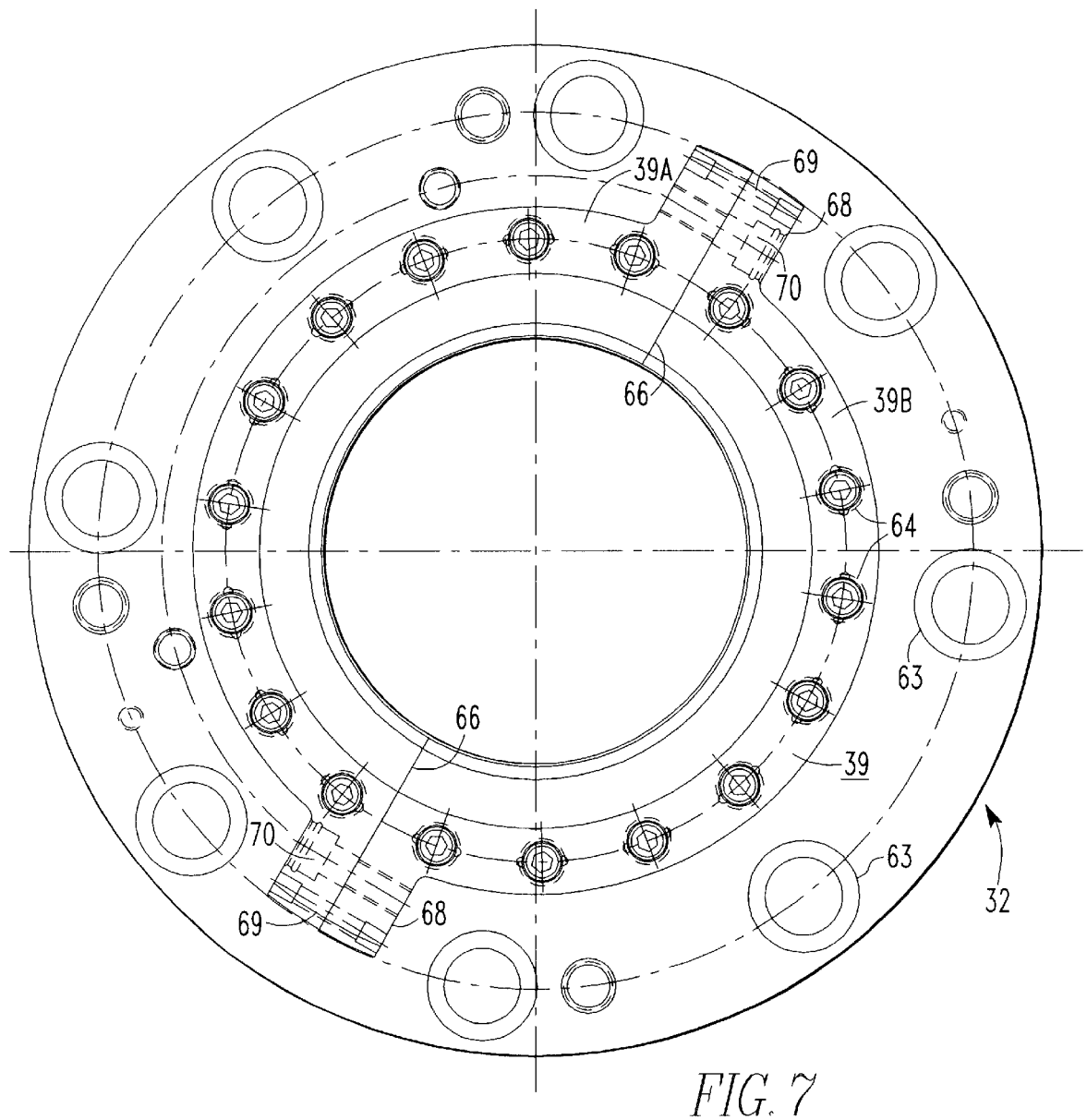
FIG. 7 is a plan view of the top of the pump casing and shaft of FIG. 1B, taken along the lines 7—7 of FIG. 1B.

As seen in FIGS. 1B, 2 and 7, the reactor coolant pump 14 generally includes a pump housing or casing 30 which terminates in one end of a multi-sectioned annular seal housing 32. The pump 14 also includes a pump shaft 34 extending centrally within the housing 30; it is sealingly and rotatably mounted within the seal housing 32. The bottom portion of the pump shaft 34 is connected to an impeller 31 (FIG. 1B) while a top portion thereof is connected through a coupling device 58, to be described, to a high horsepower induction type electric motor 29. When the motor 29 rotates, the shaft 34 and its impeller 31 within pump casing 30 cooperate to circulate the coolant flowing through the pump casing 30 at pressures from ambient to approximately 2500 psi. Formed integrally with the pump casing 30 is a main pump flange 38 upon which the lower annular segment 33 of seal housing 32 is mounted. Tandemly mounted annular seal housing segments 35 and 37 are bolted together and to segment 33 to complete the seal housing 32, with the upper end of the housing 32 having a closure cap 39 of bipartite annular construction. The upper end of the pump shaft 34 extends through seal housing 32 and closure cap 39.

Also mounted on the pump flange 38 is a generally annular motor support 40 having integral lower and upper flanges 42 and 44 thereon. The lower flange 42 includes a plurality of openings therethrough which are aligned with openings in the pump flange 38 through which threaded bolts 46 extend. Thus the motor support 40 is secured to the pump flange 38 by the threaded bolts 46 passing through openings in the motor support flange 42 and through openings, such as opening 41 (FIG. 2D), on the seal housing segment 33. The bolts 46 have threaded upper ends to which nuts 48 are secured to firmly mount the motor support 40 on the pump flange 38, concurrently securing the lower segment 33 of the seal housing 32 in place. In addition, the lower end of the motor 29 sits on the upper flange 44 of the motor support 40, to which it may also be secured by bolts (not shown). The motor support 40 has a large side opening 50 therein which is between 90° and 120° of the circumference of the motor support and which exposes the pump shaft 34, the motor shaft 52, the coupling 58, the closure cap 39, and the upper segments 37, 35, and 33 of the seal housing 32 to the exterior of the motor pump unit for maintenance purposes, as will be described.

More particularly, the motor 29 has a motor shaft 52 located above and in alignment with the pump shaft 34. The motor shaft 52 terminates in a flange 54, and the pump shaft 34 terminates at its upper end in a complementary flange 56 which may be removable, if required. If removable, flange 56 desirably is provided with a multi-sided or splined opening which closely receives a complementary splined upper end of the shaft 34 therein, so that flange 56 and shaft 34 rotate together. Flanges 54 and 56 are spaced apart and a removable flanged shaft coupling 58 is fitted in between the flanges 54 and 56. The removable shaft coupling 58 has a pair of flanges of a size complementary to that of flanges 54 and 56 and positioned to be closely received between the latter flanges and secured thereto by suitable means such as by cap bolts 60 through aligned flange openings. In this manner maintenance on the motor pump unit may be performed by removing the cap bolts 60, removing the shaft coupling 58, and removing the pump shaft flange 56, if necessary. As will be explained hereinafter, the vertical distance between the motor flange 54 and the upper end of the pump shaft 34 is maximized to permit the removal of certain of the seal components as subassemblies in order to permit their quick repair and/or replacement. Access to the bolts 60 and the shaft extension 58 is through the opening 50 in the motor support 40. Of course, a removable cover (not shown) may be placed on the opening 50 of the motor support 40, if desired.

To further accommodate quick access to the pump seals and the seal housing segments 33, 35 and 37, the seal housing 32 is provided with a bipartite closure cap 39, formed from two substantially identical complementary half-sections 39A and 39B, which also serve to support the No. 4 seal and are sealingly secured to the seal housing segment 37 by bolts 64. As will be seen in FIG. 7, the cap 39 on the seal housing is split vertically at 66; at the split portion, each half-section 39A and 39B of the cap 39 is provided with a pair of radially extending flanges 68 thereon. These flanges 68 of each half-section 39A and 39B of the cap 39 complement each other and therefore permit a portion of the cap 39 to be removed, exposing the uppermost (No. 4) seal and the inner section of the seal housing 32. The two half-sections 39A and 39B of the cap 39 are maintained in alignment with each other by taper alignment pins 69 and are sealingly secured together by bolts 70, shown in shadow in FIG. 7. The axial surfaces of the two half-sections 39A and 39B of closure cap 39 are lapped flat so that, when assembled, no leakage flows out of the cap 39 by virtue of its bipartite construction. The seal system herein described is formed to be accessible and removable to accommodate maintenance of the motor pump structure described above.

In order that the pump shaft 34 may rotate freely within the seal housing 32 while maintaining the 2500 psi pressure boundary between the interior and the exterior of the seal housing, tandemly arranged lower primary (No. 1), secondary (No. 2), tertiary (No. 3), and shutdown (No. 4) sealing assemblies 72, 74, 76, and 78, respectively, are provided in the positions illustrated in FIG. 2 above the pump impeller 31 and within the pump and seal housings 30 and 32. The lower primary (No. 1) sealing assembly 72, which performs most of the pressure sealing (approximately 2250 psi), is desirably of the non-contacting hydrostatic type, as illustrated in the above-identified Frisch and MacCrum Patents. In accordance with this invention, the No. 2 and No. 3 seals are of the normally closed, hydrodynamic type, and the No. 4 seal is a segmented seal with minimal, if any, leakage during normal operation and with the capability of serving as a shutdown seal under emergency conditions to prevent leakage outside of the pump casing in the event of malfunction of the No. 1, No. 2 , and No. 3 seals, separately or concurrently.

As seen in FIGS. 2A through 2D, the lower hydrostatic primary sealing assembly 72 (the No. 1 seal) of pump 14 generally includes a lower annular runner 80 which is mounted to the pump shaft 34 for rotation therewith, and an upper annular seal ring 82 which is stationarily mounted within the seal housing 32. The lower runner 80 has an upper annular runner face plate member or insert 83, of a wear-resistant material such as silicon nitride, mounted by a hydrostatic clamping ring member 84 to the upwardly facing surface of the runner 80. The runner 80 is keyed to the pump shaft 34 by an anti-rotational device such as a pin (not shown), extending, for example, into shoulder 96. The upper annular seal ring 82 includes an upper annular ring face plate member or insert 86, also of wear-resistant material such as silicon nitride, which is mounted by a hydrostatic clamping ring member 88 to the annular seal ring 82. The seal ring 82, in turn, is keyed to a seal ring support piece 104 by an anti-rotational means such as a pin (not shown) extending from the support piece 104 into an opening in the top of the seal ring 82 so as to prevent rotational movement of the upper seal ring 82 relative to the seal housing 32, yet allowing translatory movement of the seal ring. 82 axially along pump shaft 34 toward and away from the seal runner 80 and its insert 83. Facing surfaces 92 and 94 of the respective ring and runner face plate inserts 86 and 83 form the seal gap 93 for the No. 1 seal. They are biased toward one another as a result of the coolant pressure load on the pump shaft 34. However, the surfaces 92 and 94 along seal gap 93 do not normally frictionally engage one another, since both the surfaces 92 and 94 are tapered at a shallow angle (at their respective high pressure edges) away from each other, which allows the lower runner 80 and its insert 83 to rotate relative to the upper seal ring 82 and its insert 86 in a film-riding mode, both when the shaft is rotating and also when the shaft is stationary.

It will be further seen that the seal runner 80 of the No. 1 seal is mounted on a shoulder 96 formed on the shaft 34, with the shoulder 96 being upwardly facing and located outwardly of the remaining upper portion of the shaft. In addition, one of a number of closely fitting removable annular shaft liners 98 is positioned to sit on a shoulder 100 located above shoulder 96 on the shaft and mounted so as to be fixedly secured to shaft 34 and, of course, rotatable therewith. Seal housing 32 includes an upstanding annular interior seal support member 102 which is mounted within seal housing 32, with the lower portion thereof located opposite seal ring 82 of the No. 1 seal and having an L-shaped annular seal support piece 104 secured to a downwardly facing surface thereof, with the vertically extending section 106 of the L-shaped seal support piece 104 being co-extensive with an upper portion of the seal ring 82. The seal ring 82 includes a secondary channel seal 108, engaged by an O-ring 109 located in a recess machined into the inwardly facing side of the upper section of the seal ring 82, and which receives O-ring 109 therein to prevent leakage between seal ring 82 and the seal support piece 104, except through the seal gap 93. Examples of channel seals 108 and O-rings 109 are contained in the afore-mentioned Bice et al. Patent.

In order to ensure that coolant passes along the No. 1 seal only through the seal gap 93, several O-ring seals are provided in complementary recesses to prevent bypassed fluid flow—for example, an O-ring in recess 110 extends toward the shaft 34 below shoulder 96 to seal between shaft 34 and the seal runner 80. In addition, two O-rings in two recesses 112 prevent leakage between the outer surface of the seal runner 80 and the clamping ring 84, while an O-ring and recess 114 seals the surface between the seal runner insert 83 and the seal runner 80.

An additional O-ring and recess seal 115 is formed on the lower surface of seal ring 82 that engages its insert 86. Similarly, the clamping ring 88, which clamps the seal ring insert 86 to the No. 1 seal ring 82, has a pair of seals formed by recesses and O-rings 116 to prevent leakage between the clamping ring 88 and the No. 1 seal ring 82. In addition, the L-shaped seal support piece 104 is secured to seal support member 102 with a sealing means interposed therebetween and illustrated as O-ring and recess 118, which prevents leakage between those housing parts. Moreover, seal support member 102 is sealingly mounted within seal housing 32 so that leakage is prevented between those parts by an O-ring and recess combination 120, both of annular configuration. All of the latter sealing devices serve to prevent leakage flow except through the seal gap 93 of the No. 1 seal. It will be seen that seal ring 82 is captured within seal support member 102 and seal support piece 104 such that the seal ring 82 co-extends with a portion of each of the latter parts. More particularly, the downwardly facing segment 106 of seal support piece 104 captures the inwardly facing vertical surface of the seal ring 82, while the outwardly facing surface 122 of seal ring 82 is positioned to co-extend with a downwardly extending flange 124 on seal support member 102, so that seal ring 82 fits loosely within the flange 124. The upward movement of seal ring 82 is stopped by the downwardly facing surfaces 126 and 128 on seal support member 102 and piece 104, respectively. The downwardly extending flange 124 of seal support member 102 has an inwardly facing annular recess 130 which co-extends with a portion of seal ring 82, and the latter has an outwardly extending ring 132 that is clamped between seal ring 82 and clamping ring 88, which extends into the recess 130 in seal support member 102. Since ring 132 overlies the shoulder at the lower terminus of recess 130, when seal support member 102 is lifted upwardly out of the seal housing 32, it carries with it the seal ring 82 of the No. 1 seal by virtue of the engagement of ring 132 with the shoulder at the lower end of recess 130. As will be discussed later, removal of the seal support member 102 by an upward lift will also bring with it the No. 1 seal ring 82, including the seal ring insert 86, for maintenance and replacement purposes.

Within seal housing 32 and mounted on shaft 34 is an intermediate removable shaft sleeve 134, which is vertically aligned with lower shaft sleeve 98 and rests on top of it. An O-ring and recess combination 136 is formed between sleeve 134 and shaft 34 to prevent any leakage from the interior of seal housing 32 along a path between the sleeve 134 and shaft 34. The intermediate sleeve 134 co-extends vertically with the No. 2 seal assembly 74 of the seal system for the motor pump 14.

The seal runner 138 for the No. 2 seal is mounted on the intermediate shaft sleeve 134 adjacent the lower edge thereof and fixed in position to be rotatable therewith. The runner extends radially outwardly from the sleeve 134 and has a runner insert 140 at the upper end thereof forming the upwardly facing horizontal seal surface of the runner 138. A pin (not shown) extends upwardly from the runner 138 into an opening in the seal runner insert 140 to ensure that the insert 140 rotates with the shaft 34. The seal runner insert 140 is secured to the seal runner 138 by an annular clamping ring 139. An annular groove 141 is machined in the upwardly facing surface of seal runner 138 and receives an O-ring therein which engages the seal runner insert 140 to prevent leakage therebetween. A second O-ring 143 is positioned between the clamping ring 139 and the runner insert 140 adjacent the outer edge of the insert. The O-ring 143 serves as a resilient interface between the runner insert 140 and the clamping ring 139. The seal runner 138 is fixed in position on the shaft sleeve 134 by a lock nut 142 which is threaded to the lower end of the shaft sleeve 134 to extend outwardly therefrom and is secured in position by a metallic locking cup 144. The lower side of the seal runner 138 rests on the top of the lock nut 142 and locking cup 144. A pair of alignment pins 146 (only one of which is shown), press fitted into the bore of runner 138, engage slots machined into shaft sleeve 134 to prevent relative rotation, ensuring that the runner 138 rotates with the shaft 34. Upward movement of the seal runner 138 along the shaft sleeve 134 is prevented by a spacer sleeve 148.

Figure 8:
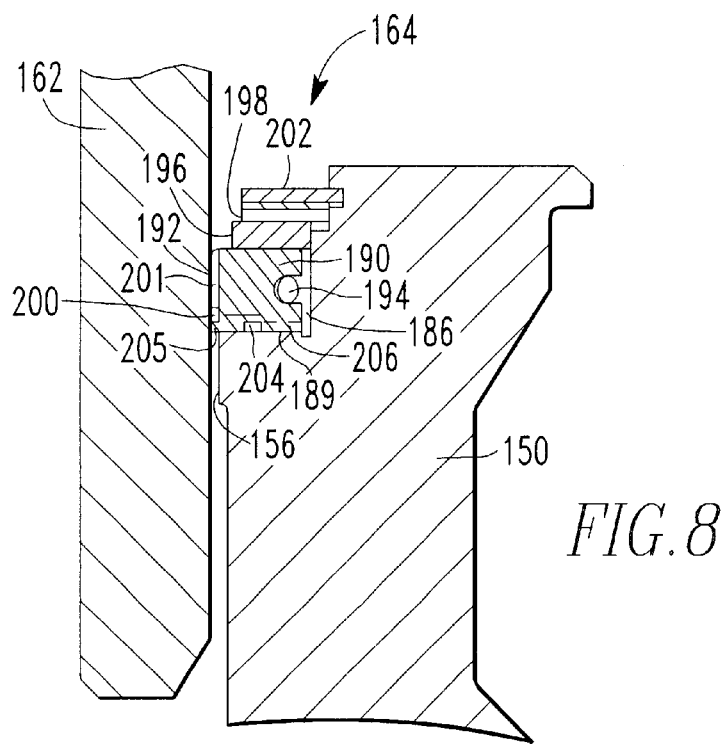
FIG. 8 is a sectional view showing the piston ring seal for the No. 2 seal of FIGS. 2B and 2C.

The No. 2 seal 74 also includes an annular seal ring 150, which is movable within limits between the upper surface of the No. 2 seal runner insert 140 and a fixed seal housing member 154. The seal ring 150 includes an annular downwardly extending flange 152, which is located radially outwardly of the outer axially extending surface of the seal runner 138 and runner insert 140. Annular seal housing segment 35, which rests on and extends upwardly of annular seal housing segment 33, contains the No. 2 seal assembly. It co-extends outwardly of the No. 2 seal ring 150 and extends above the latter toward shaft 34. The seal housing segment 35 also includes the downwardly extending L-shaped inner annular housing member 154, which is secured to the downwardly facing innermost surface on the lower side of housing segment 35, and has a downwardly extending annular leg 162 interposed between the shaft 34 and the inner circumferential surface 156 of seal ring 150. The base 158 of the L-shaped member 154 is secured to the No. 2 seal housing segment 35 by threaded bolts 160, and the downwardly extending annular leg 162 co-extends with a substantial portion of the inner circumferential surface 156 of seal ring 150. A piston ring seal 164 is interposed between the seal ring 150 and the leg 162 of the housing member 154. The seal 164 is shown in detail in FIG. 8 and will be described below.

The seal ring 150 has a seal insert 166, desirably formed of a carbon-graphite material, located in a downwardly facing recess 168 along the lower surface of the seal ring 150 inwardly of the flange 152, such that the seal ring insert 166 is positioned above and in alignment with the runner insert 140. The seal ring insert 166 is secured to the seal ring 150 by suitable means such as by an interference fit between the relatively higher expandable seal ring 150 made of metal and a relatively low expansion carbon-graphite insert 166. In the event any pressure buildup occurs between the seal ring 150 and the insert 166, an annular groove 167 on the outer periphery of the insert 166 is provided, together with a plurality of spaced vents such as 169 extending radially inwardly from the groove 167 to the inner low pressure edge of the seal ring insert 166.

Figure 4:
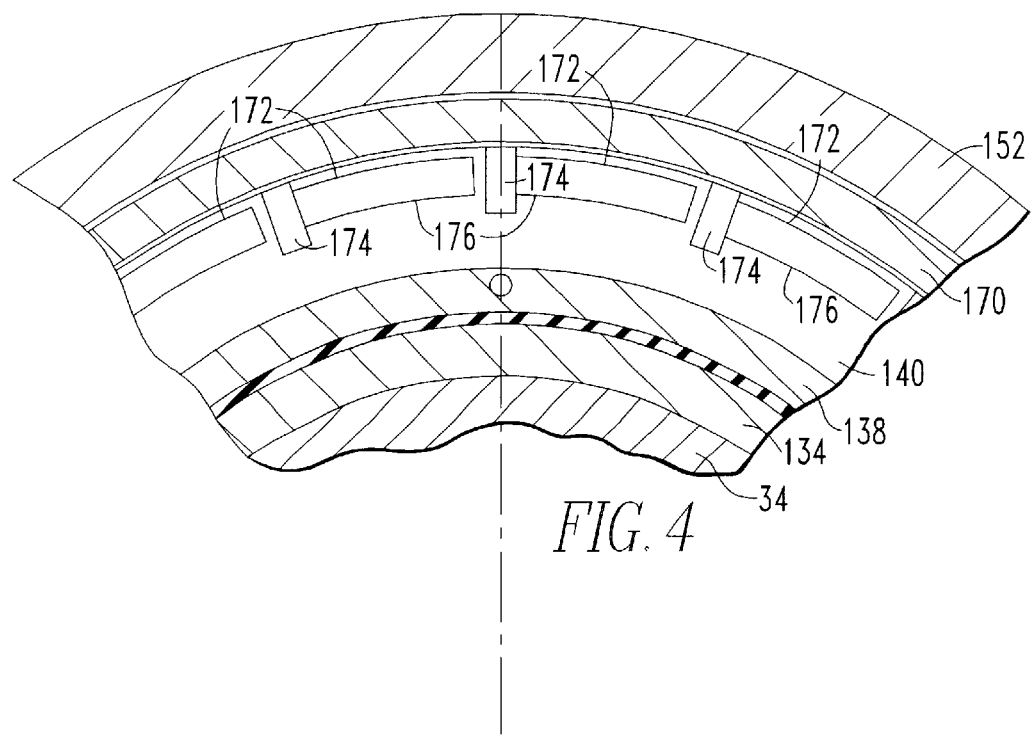
FIG. 4 is a view similar to FIG. 3 of the No. 2 seal showing the sealing surface of the No. 2 seal runner insert, taken along the lines 4—4 of FIG. 2C.

In accordance with this invention, the No. 2 seal assembly 74 is designed such that the seal ring 150 and seal runner 138 form a hydrodynamic seal with a seal gap 170 extending between seal ring 150 and seal runner 138. The seal ring is designed so that high pressure, which is located in the region between the No. 2 seal housing segment 35 and the seal ring 150, is forcing the seal ring 150 toward the seal runner 138, so that, when the shaft 34 is not rotating, insert 166 of the seal ring 150 engages the seal runner insert 140 to close the seal gap 170. This can be seen by comparing the area of the seal ring 150 which is exposed to high pressure forcing the seal ring down, versus the area of the seal ring 150 which is exposed to high pressure urging the seal ring in the upward direction. The net force on the seal ring is such as to maintain the gap closed when the shaft 34 is stationary. The seal runner insert 140, in accordance with the invention, is formed from a relatively hard, wear-resistant material such as silicon nitride, and has precisely machined in its upper surface a plurality of shallow Rayleigh-type pockets 172 (FIG. 4), coupled to the outer circumferential surface of the insert 140 by a plurality of feeder grooves 174, extending radially to connect the pockets 172 to the high pressure fluid at the outer perimeter of the runner insert 140. As is known in the art, Rayleigh-type pockets are relatively shallow pockets which create an axial (upward) force therein by the velocity shearing gradient of the fluid, either gaseous or liquid, which is being forced into the pockets.

Pockets 172 are shallower than the feeder grooves 174, so that liquid passing into the seal gap 170 will flow into the feeder grooves 174 and then into the pockets 172. The forces created in the Rayleigh pockets will serve to push the seal ring 150 and its insert 166 up and away from the upper surface of the seal runner 138 to create a small but nonetheless positive gap or film between the seal ring 150 and the seal runner 138. It will be noted that the carefully machined seal runner insert pockets 174 and 172 are, in accordance with this invention, machined into a relatively wear-resistant, harder material than the material forming the seal ring insert 166, which would be in rubbing contact with the seal runner insert 140. The seal ring insert 166, formed from a relatively softer carbon-graphite material, will wear more readily than the seal runner insert 140. Thus any wear caused by rubbing of the insert 166 against the insert 140 will be on the seal ring insert 166, which has less complex machining and is therefore less costly to replace. Furthermore, it will be seen that a groove 178 is machined in the seal ring insert 166 to overlie a portion of the feeder groove 174 located radially inward of the inner edge 176 (FIG. 4) of the pocket and to overlie a portion of the upper surface of the seal runner 140 that is radially inward of edge 176 of Rayleigh pocket 172. By virtue of this construction, it will be seen that the seal ring insert 166 actually forms the sealing dam 180 for the No. 2 seal. Thus any wear of the sealing dam as a result of rubbing contact will be on the seal ring insert 166, rather than on the seal runner insert 140.

In order to ensure proper operation of the Rayleigh-type No. 2 seal, it is important for this application that the Rayleigh pockets 172 have liquid therein rather than gas or steam. In order to prevent the creation of a gas pocket between the seal ring 150 and seal runner 138, which would prevent liquid flow along the seal gap 170, there is provided a plurality of circumferentially spaced passageways 183 extending through the seal ring 150 from the seal gap 170 to the high pressure region above the seal ring 150.

The seal ring 150, when the shaft is stationary, will be seated closed with the sealing dam 180 in engagement with the upper surface of the seal runner insert 140, preventing any leakage along the seal gap 170. Leakage along other paths such as between the seal ring surface 156 and the vertical leg 162 of the L-shaped annular housing member 154 is prevented by the seal 164. Similarly, any other leakage path, except along the seal gap 170, is prevented by the use of strategically located sets of O-rings and grooves extending between adjacent parts as illustrated in FIG. 2. For example, the afore-mentioned O-ring and groove 141 is positioned between the seal runner insert 140 and the seal runner 138. In addition, a plurality of L-shaped holes 182 (exposed to low pressure) are machined into the seal runner 138 and spaced equidistantly around the upper surface of the seal runner 138 at a position between the inner end of the sealing dam 180 and the outer surface of the positioning sleeve 148. Also, holes (not shown) exposed to high pressure may be machined into the seal runner 138 between a surface of the runner 138 exposed to high pressure and the inner surface thereof located adjacent shaft sleeve 134. It will be noted that the low pressure holes 182 and the high pressure holes provide a restoring moment to the No. 2 seal assembly during operation, thereby minimizing roll of the runner 138 and the insert 140—for example, roll about the centroid thereof When shaft 34 is rotating and the system is pressurized, high pressure fluid which exits from the No. 1 seal will flow to the outer periphery of the No. 2 seal ring 150, and a portion of the liquid will flow through the seal gap 170 into the Rayleigh pockets 172 through feeder grooves 174, in which there is created an upward force by the shearing velocity gradient in the Rayleigh pockets 172, which will move the seal ring away from the seal runner 138 to form a small but positive gap to permit small but positive leakage across the No. 2 seal assembly 74.

In order to prevent leakage across the No. 2 seal except along the seal gap 170, the secondary seal 164, located between the seal housing leg 162 and the seal ring 150, prevents leakage therebetween but permits axial movement of the seal ring 150 toward and away from seal runner 138. The seal 164 is located at the upper end of the inner axial surface 156 of the seal ring 150 and is shown in more detail in FIG. 8.

As has been noted, an O-ring seal such as that employed on the No. 1 seal has the potential to hang up and possibly prevent complete sealing operation of a seal 72, 74, or 76 by virtue of its impeding the axial movement of the seal ring thereof toward or away from the seal runner. Thus channel seals such as seal 108 which may have higher frictional forces than desired at certain times may be a potential problem. The seal assembly for the No. 2 seal of this embodiment is a piston ring seal and is received in an inwardly and upwardly facing cutout 186, formed in the seal ring 150 at the upper end of inner surface 156 thereof. The upwardly facing surface 188 of the cutout 186 is finely machined to serve as a secondary sealing surface for a split piston ring 190. The piston ring 190 is of conventional piston ring construction and is desirably formed from a carbon-graphite composite material, with an overlapping tongue and socket-type split therethrough to permit the ring to move radially inwardly and outwardly, yet such that little or no leakage along the split occurs. The piston ring 190 has its finely machined inner bore surface 192 engaging the confronting outer surface of the leg 162, which surface also has been finely machined to ensure appropriate sealing. A garter spring 194 is positioned in a complementary recess formed on the surface of the piston ring 190 opposite bore surface 192 to urge the piston ring into contact with the confronting surface of housing leg 162. The piston ring 190 is fixed within the cutout 186 by a spring plate 196 which engages the upwardly facing surface of the piston ring 190 and a wave spring 198 which engages the spring plate 196. The wave spring 198 is then held in compression by a split snap ring 202, which is snapped into a circumferential groove formed in the upper end of the cutout 186. The lower face surface 189 of the piston ring which engages the machined face surface 188 of the cutout is also finely machined and has a circumferential groove 204 formed therein (except that the circumferential groove 204 is not continuous at the split in the piston ring 190). A plurality of radially extending spaced passageways 206, shown in shadow, extend from the groove 204 to the outermost surface of the piston ring 190 for pressure relief. The piston ring bore surface 192 has a circumferential groove 200 stopping at both sides of the split in the piston ring 190. The groove 200 is pressure-relieved by multiple axial grooves 201. This is done to minimize bore load and therefore minimize sliding friction. Thus the piston ring 190 has a bore sealing dam 203 located between the groove 200 and the lower face surface 189, and the lower face surface 189 of the piston ring 190 has a face sealing dam 205 thereon between groove 204 thereof and the intersection of face surface 189 with bore surface 192. It is known in the art that a carbon-graphite piston ring seal has a lower friction load than an O-ring; thus the likelihood of the piston ring seal assembly 164 significantly impeding axial movement of the seal ring 150 toward and away from the seal runner 138 is substantially minimized when compared with the likelihood of such impedance by an O-ring seal.

Located above the No. 2 seal assembly 74 is the No. 3 seal assembly 76, which in this example of the invention is also a hydrodynamic Rayleigh-type seal. The No. 3 seal assembly includes a seal runner 208 and a seal ring 210 mounted within housing segment 37 above the runner 208 and movable axially relative to shaft 34 toward and away from the top surface of the runner. The seal runner 208 is of annular configuration and closely receives the shaft sleeve 134 in the center thereof Sleeve 134 has a downwardly facing shoulder 212 formed therein, which engages the upper end of the runner 208 and limits the upward movement of the latter. A pair of spaced alignment pins such as pin 214 extend between the runner 208 and the sleeve 134 to prevent relative rotation of the runner 208 and sleeve 134. An outwardly facing annular groove and O-ring sealing assembly 216 is positioned on the outer surface of sleeve 134, with the O-ring thereof in engagement with the axial inner surface of No. 3 runner 208 to prevent leakage therebetween. The lower end of runner 208 engages the upper surface of spacer sleeve 148. Thus it will be seen that the No. 3 runner 208, the spacer sleeve 148, and the No. 2 seal runner 138 are all maintained in position on the sleeve 134 by the lock nut 142 and locking cup 144.

Figure 3:
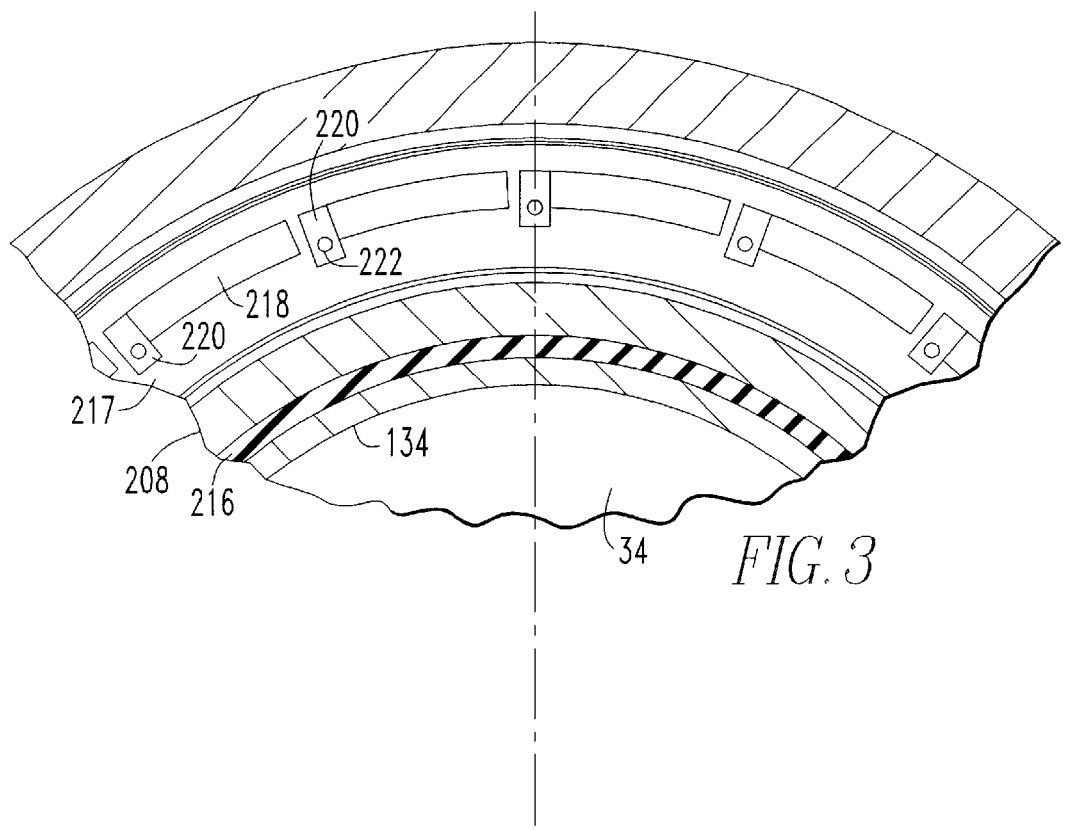
FIG. 3 is a plan view partially in section of a segment of the sealing surface of the runner of the No. 3 seal, taken along the lines 3—3 of FIG. 2B.

As seen more clearly in FIG. 3, the upper horizontal surface 217 of the No. 3 seal runner 208 is finely machined and has a plurality of circumferentially aligned, upwardly facing, relatively shallow Rayleigh pockets 218 formed therein, extending about the entire circumference of the surface 217 and being connected at the leading edge of each pocket 218 to a radially extending, relatively deeper feeder groove 220, respectively. Pumping passageways 222 are formed in the base of each of the feeder grooves 220, which extend downwardly and inwardly through runner 208 at an acute angle relative to the shaft 34 to open to an interior housing region 224, which is on the higher pressure side of the No. 3 seal assembly 76. The passageways 222, since they extend outwardly and vertically, from bottom to top, serve to pump liquid from the housing region 224 into the feeder grooves 220 and therefrom into each of the Rayleigh pockets 218. Thus the feeder grooves 220 and pumping passageways 222 serve to ensure that the Rayleigh pockets are supplied with liquid when the shaft 34 is rotating. This creates the velocity shearing gradient forces on seal ring 210 that enable the No. 3 seal to function even when the liquid level within the housing region 224 does not reach the level of the upper surface 217 on the No. 3 seal runner 208.

Figure 2A:
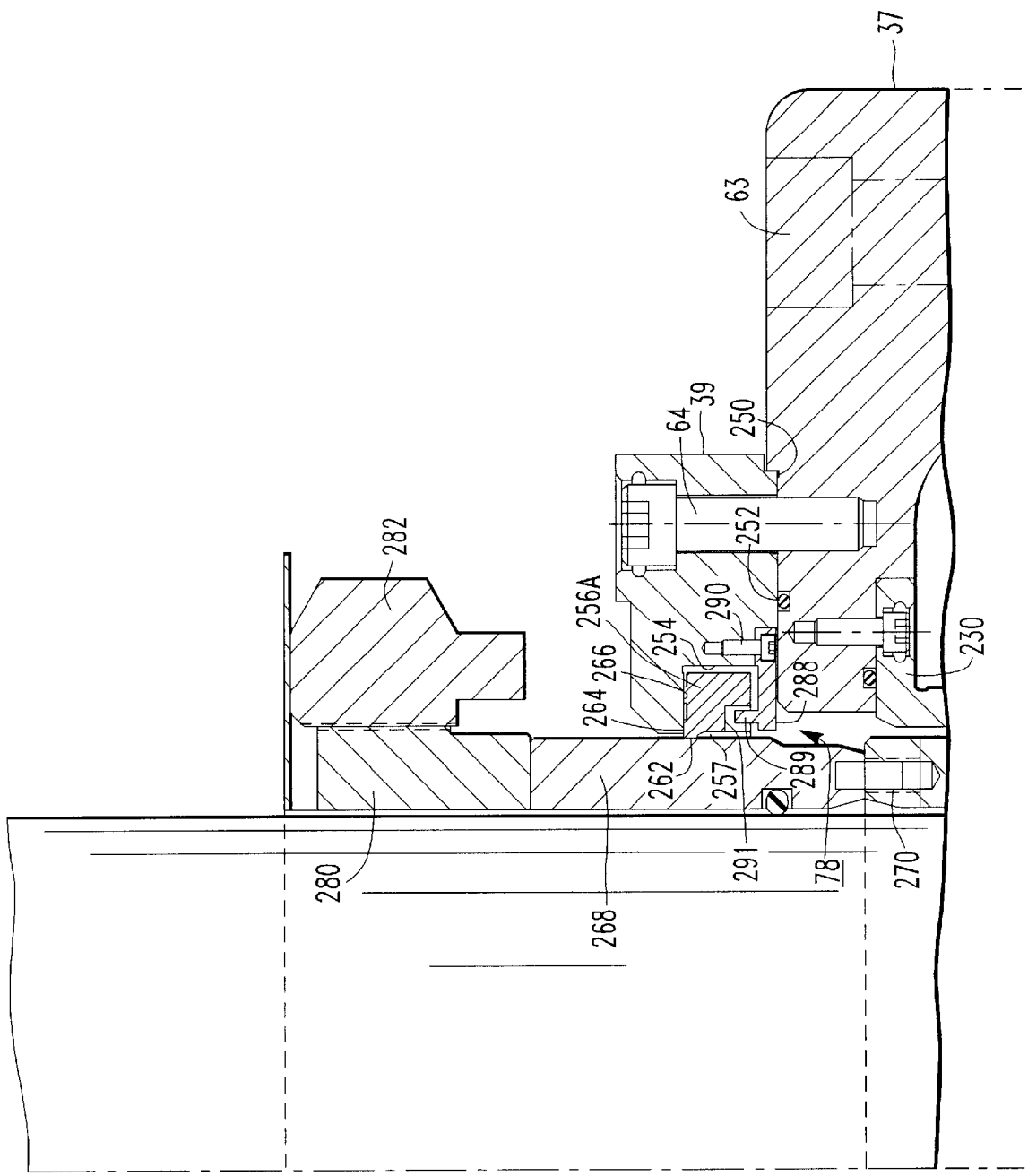
Figure 2C:
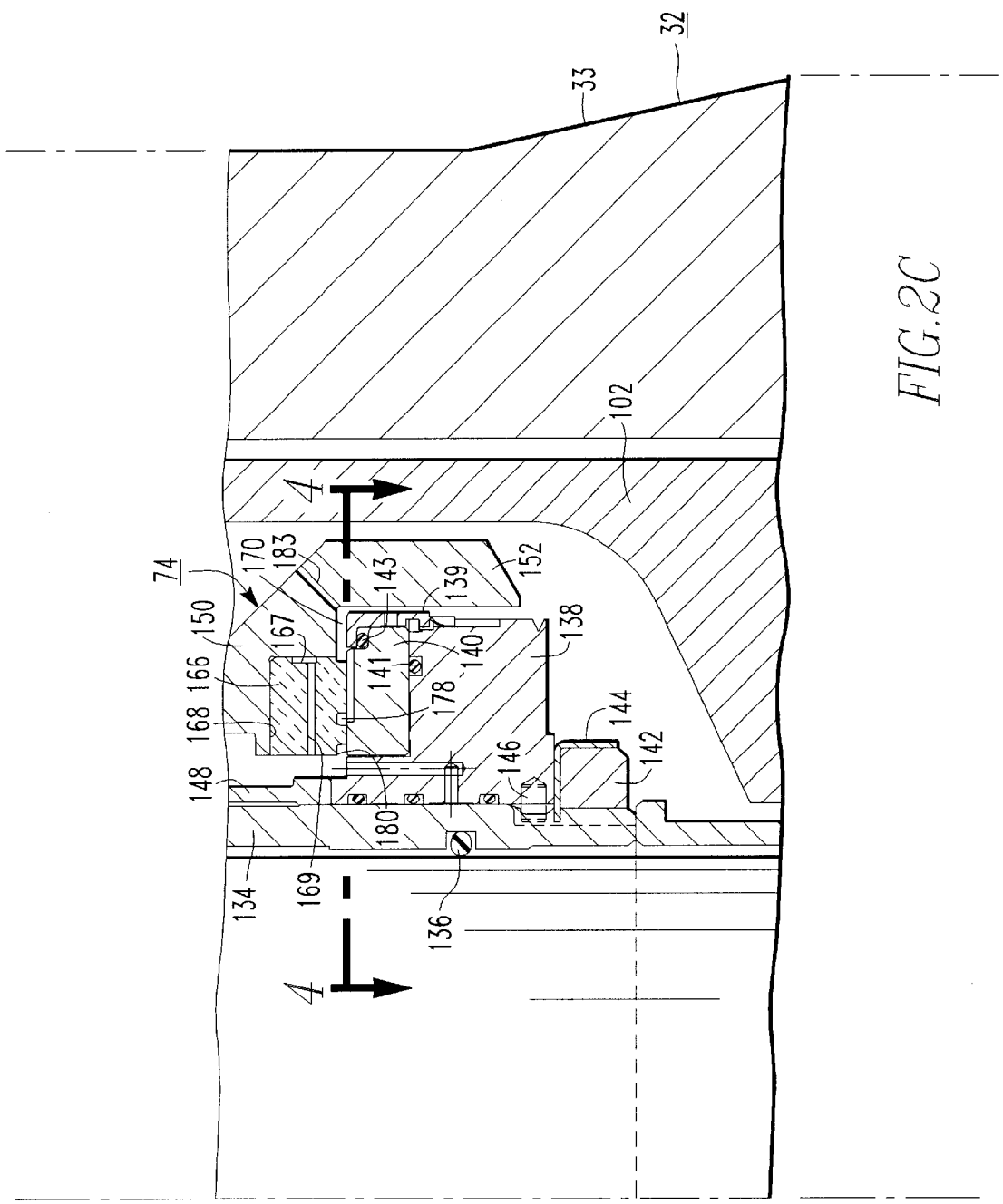
Figure 2D:
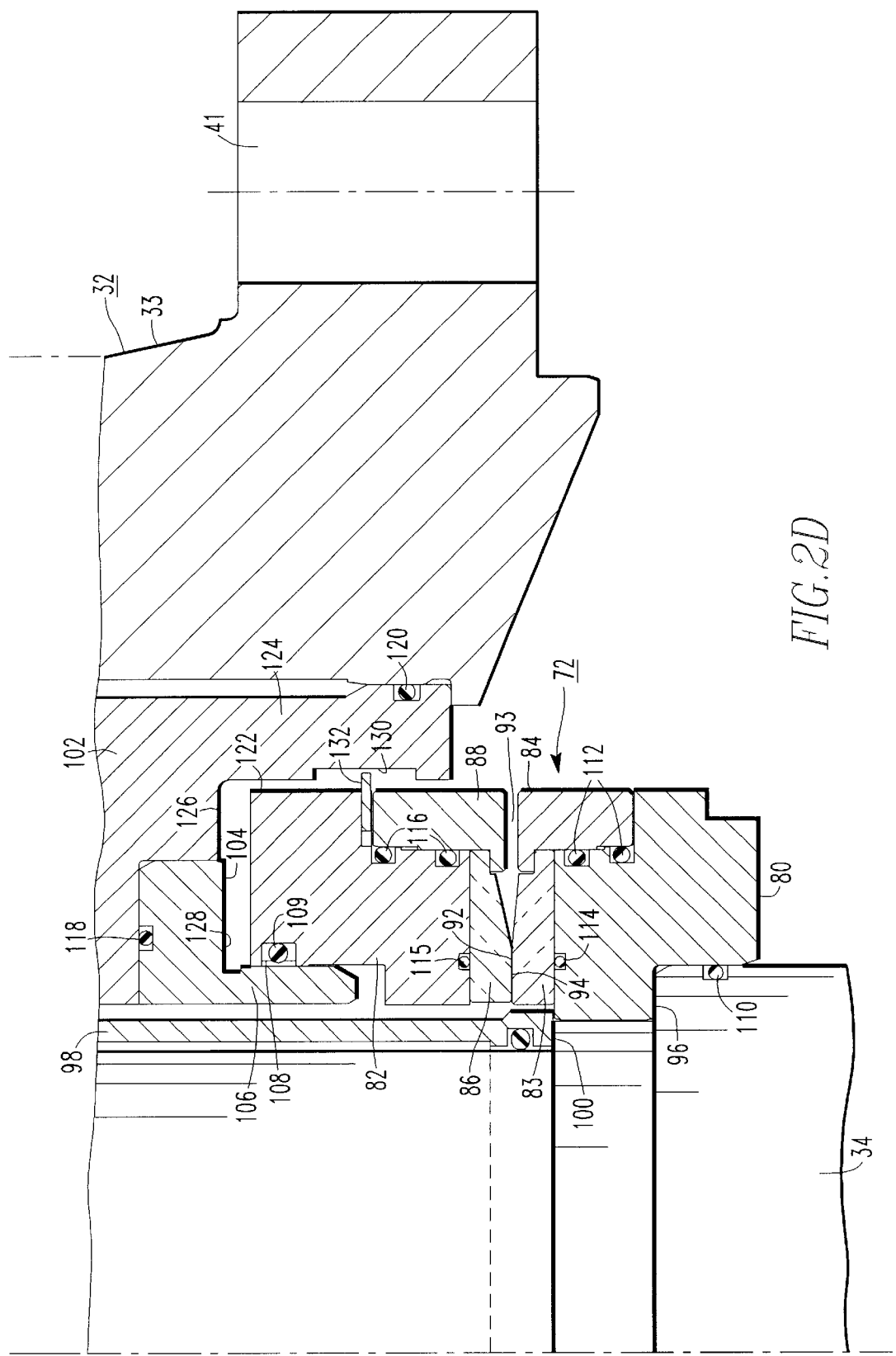

The No. 3 seal assembly 76 sits in the seal housing 32 in an annular housing region above the No. 2 seal, which region is formed by the generally L-shaped annular housing segment 37 sealingly secured above and to annular housing segment 35 by a pair of circumferentially spaced bolts 226. A seal is created between housing segments 35 and 37 in a leak-tight manner by a recess and O-ring combination 228 engaging confronting vertical surfaces of the housing segments 35 and 37. A similar seal is created between housing segments 35 and 33 by a recess and O-ring combination 229. The final bolting together of seal housing segments 35 and 37 and of those segments to seal housing 33 is accomplished by eight large bolts 63 (FIGS. 2A, 2B and 7).

The upper end of housing segment 37 extends inwardly toward shaft 34 and overlies the seal ring 210 of the No. 3 seal. An annular L-shaped housing part 230 is mounted on the inner lower surface of the housing segment 37 and has a downwardly extending leg 232 which lies between the upper inner surface of the seal ring 210 and the upper end of the sleeve 134. The housing part 230 and its leg 232 play the same role for the No. 3 seal as the housing part 158 and its leg 162 do for the No. 2 seal, and as the housing part 104 and its leg 106 do for the No. 1 seal. The outer surface of the leg 232 is finely machined, and the inner vertical surface of the ring 210, which confronts the outer surface of leg 232, has a seal 234 which, in this example, comprises an O-ring (or which may be a channel seal/O-ring combination) positioned in an annular inwardly facing groove formed in the seal ring 210 and closing the gap between the leg 232 and seal ring 210. While the O-ring of seal 234 sealingly engages the outer surface of the leg 232, it nonetheless permits axial movement of the seal ring 210 along the leg 232 toward and away from the seal runner 208, concurrently preventing fluid flow across the seal 234. The No. 3 seal ring 210 includes an annular downwardly extending flange 236, which is located radially outwardly of the outer axially extending surface of the seal runner 208 The seal ring 210 has a ring-shaped seal insert 238 desirably formed from a carbon-graphite composite material, located in a downwardly facing recess along the lower surface of the seal ring 210 and inwardly of the flange 236, such that the seal insert 238 is positioned above and overlying the Rayleigh pockets 218 in the upper surface 217 of seal runner 208. The seal insert 238 is secured to the No. 3 seal ring 210 by suitable means such as by an interference fit between the relatively higher expandable seal ring 210, made of metal, and the relatively low expansion carbon-graphite insert 238. An annular groove, together with a plurality of spaced vents similar to the groove 167 and vents 169 of the No. 2 seal, are provided in the seal insert 238 to relieve pressure build-up between the seal insert 238 and seal ring 210. Thus seal ring 210 and its insert 238 form a sealing gap 240 between seal insert 238 and the upper surface 217 of the seal runner 208. Since the seal ring 210 has the downwardly extending flange 236 located near the seal gap 240, the seal ring 210 and flange 236 could create a gas pocket in the region on the outer edge of seal gap 240. Such a gas pocket is prevented by the provision of spaced vents 242 passing through the upper end of flange 236, having the inner end exposed to the seal gap 240 and the outer end of the vents 242 leading to the housing region on the high pressure side of the seal ring 210, i.e., the housing region between the outer surface of seal ring 210 and the inner surface of housing segment 37. The vents 242 play the same role as the vents 183 in the No. 2 seal.

The No. 3 seal assembly 76 is formed such that the seal ring 210 and seal runner 208, together with the Rayleigh pockets 218, form a normally closed hydrodynamic-type seal for the No. 3 seal. In furtherance of this purpose, the downwardly facing surface of the No. 3 seal insert 238 includes an annular groove 244 formed therein, overlying, in part, the inner edge of the Feeder Grooves 220 closer to shaft 34, and overlying, in part, the runner surface 217, so that the segment of the seal insert 238 disposed inwardly of the groove 244 serves as a sealing dam 245 for the No. 3 seal. It is important, however, that the outer edge of the groove 244 terminate within the Feeders Grooves 220 and that the remaining downwardly facing surface of the seal insert 238 located outwardly of groove 244 have a segment thereof engaging that part of the surface 217 on the seal runner 208 positioned outwardly of the Rayleigh pockets 218. In this way, the Rayleigh pockets have a surface on the seal insert 238 upon which to exert the upward force created by a Rayleigh pocket, when the shaft is rotating, to create a small but positive seal gap or film along the gap 240.

As mentioned above, the seal assembly 76 is of the hydrodynamic type such that, when the shaft 34 is stationary, the sealing dam 245 engages the upper surface 217 of the runner 208 to provide a closed seal. This is achieved by the fact that high pressure acting downwardly on the seal ring 210 acts upon a larger area with the downward force than the area of the seal ring 210 that is exposed to an upward force. When the shaft is rotating, however, liquid is forced into the Rayleigh pockets 218 of the No. 3 seal by the pumping passageways 222 and, by virtue of the velocity shearing gradient and upward force, is urged upon the seal ring 210 in opposition to the net downward force to create the small but positive gap or film between the seal runner 208 and the seal ring 210.

In accordance with the prior art, the employment of a No. 1, a No. 2, and a No. 3 seal has been the totality of sealing means utilized for reactor coolant pump applications. However, in this embodiment of the invention, a back-up or shutdown No. 4 seal is provided, which functions in a conventional sealing mode during normal operation and as a shutdown seal during emergency conditions, whether or not the shaft is rotating. In accordance with the invention, it is important that the No. 4 seal be a low-wearing segmented seal which co-acts with an axial part of the rotating shaft and is designed such that, in the event extremely high pressure appears across the No. 4 seal, the seal will still function, either as a rubbing seal, if the shaft is rotating, or as a shutdown seal, if the shaft is stationary.

Figure 6:
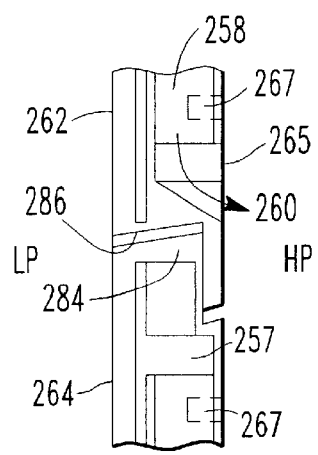
FIG. 6 is a plan view illustrating the interior vertical surface of a part of the seal segments of the No. 4 seal of FIG. 5, taken alone the lines 6—6 thereof.

The No. 4 seal 78 of this embodiment is positioned within the two half-sections 39A and 39B of the closure cap 39. The two half-sections 39A and 39B are pinned together by alignment pins 69 extending between the complementary flanges 68 thereof and then machined as a single unit so that a downwardly facing horizontal surface 266 of the two half-sections 39A and 39B becomes a continuous sealing surface for the No. 4 seal 78. The bipartite closure cap 39 is secured to the top of the seal housing segment 37 by cap bolts 64, which are locked in position by appropriate bolt locking means. The radial position of the closure cap 39 relative to the top of the seal housing segment 37 is fixed by complementary shoulders at 250, formed on the upper surface of the housing segment 37, so as to form a slight recess in the upwardly facing surface thereof. An O-ring 252 is disposed in a recess in the latter surface to provide a seal between the closure cap 39 and housing segment 37. The No. 4 seal ring 256, shown in detail in FIG. 6, is illustrated in this example as having six assembled segments 256A. These segments 256A have a primary sealing surface at their inner circumference or bore surface 257 and a secondary sealing surface on the upwardly facing surfaces 264 of each segment 256A of seal ring 256. A seal-receiving annular recess 254 is formed in closure cap 39 (when the parts thereof are assembled together) and is downwardly facing along the inner circumference of the closure cap 39. A particularly synergistic combination is achieved when the No. 4 segmented seal assembly 78 is a hydroload-type seal, i.e., described in U.S. Pat. No. 4,082,296 issued to Philip C. Stein, referred to hereinabove. Thus in this embodiment a segmented hydroload seal will be described as preferred. Greater details may be found in the above-mentioned Stein patent, which is incorporated by reference herein. Each hydroload seal ring segment 256A has in this example two circumferentially spaced pockets 258 in the bore surface 257 connected at the trailing edges of the pockets 258 to the high pressure edge of bore surface 257 by transverse grooves 265, respectively, which, when receiving fluid, create forces which move each seal ring segment 256A toward the inner rotating member such as shaft 34, reducing the seal gap therebetween. Such inward motion is caused by the fluid received within the pockets 258 being pumped back into the higher pressure section of the housing from where it came.

Figure 5:
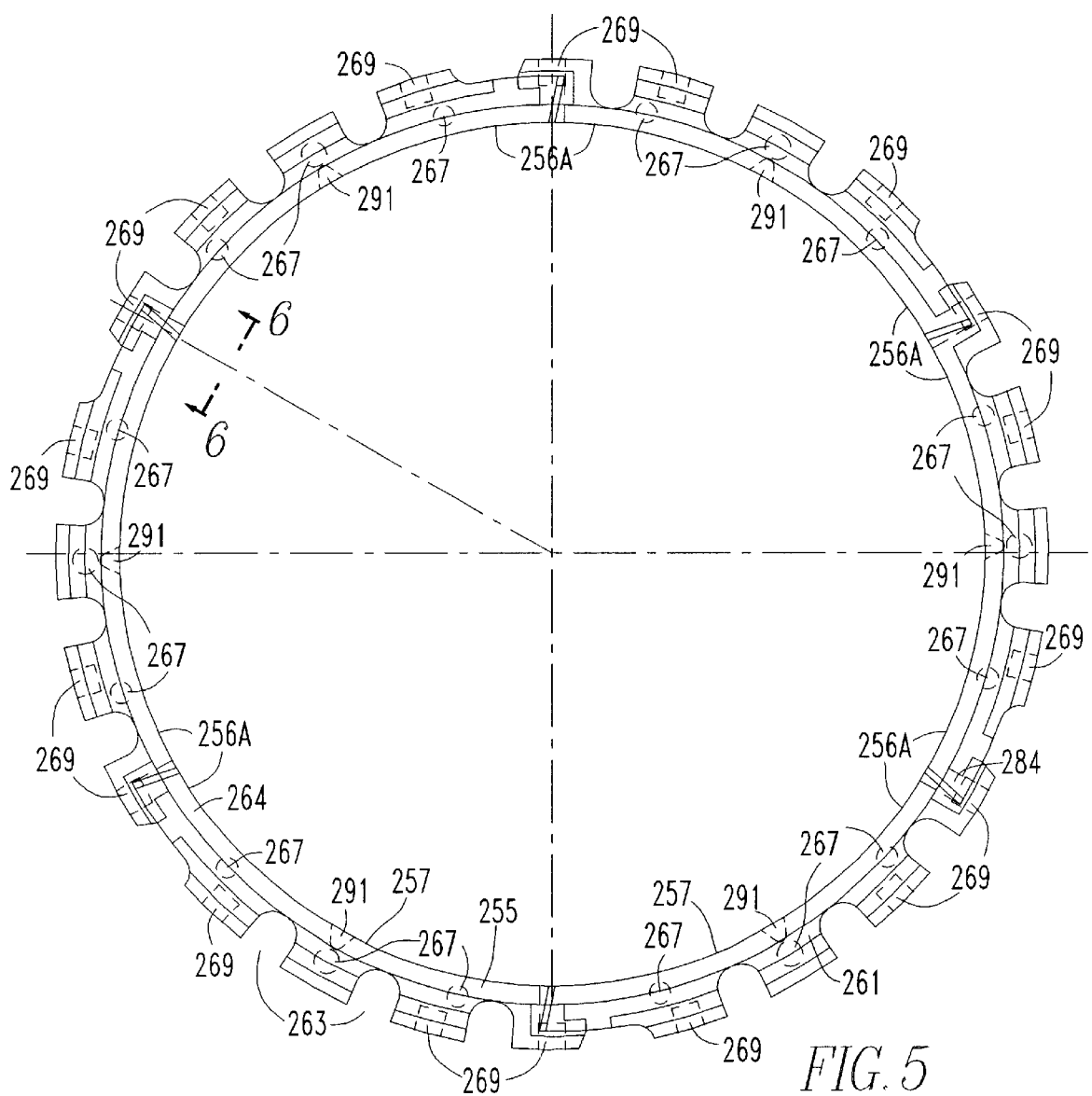
FIG. 5 is a top plan view of the segments forming the No. 4 seal.

The segments 256A of hydroload seal 78 of FIGS. 2, 5, and 6 hereof are mounted in closure cap 39 such that high pressure (HP) appears on the right-hand side of bore surface 257 (FIG. 6) and low pressure (LP) on the left-hand side of bore surface 257. The pumping action of the hydroload pockets 258 moves fluid out of the pockets 258 back into the high pressure region of the seal in the direction of the arrow 260. A sealing dam 262, formed on the low pressure (upper) side of the bore surface 257 between the pockets 258 and the edge of the bore surface 257, serves as a rubbing face, normally with almost no wear, between the seal ring segments 256A and the rotating shaft under most low pressure differentials across the seal. If, however, an enormous pressure, such as 2500 psi from a reactor system, were to appear across the hydroload seal segments 256A of the No. 4 seal 78, the total pressure would be on the outer periphery of each of the seal segments, moving the bore surface 257 of the seal segments into engagement with the rotating shaft 34 (or the sleeve thereon) to ensure rubbing between the sealing dam 262 and the rotating component, and concurrently augmenting the force of engagement of the sealing dam 255 formed on the upper surface 264 of the segments 256A and the downwardly facing seal surface 266 of closure cap 39. Under this circumstance, significantly greater wear of the sealing dam 262 would occur. The outer periphery of each of the seal segments 256A has holes 269 (shown in shadow in FIG. 5) for receiving compression springs (not shown) extending from the radial surface of seal receiving recess 254 into the spring receiving holes 269 in the outer axial surface of seal segments 256A. As shown in FIG. 5, three coiled springs extend into three holes 269 in each seal segment 256A to provide a positive spring force on the seal ring segment 256A and the bore surface 257 toward the shaft 34. The secondary seal between the surface 264 on the seal segments 256A and the downwardly facing housing surface 266 within the recess 254 of closure cap 39 may have a pressure-relieving circumferential recess 261 formed approximately midway in the surface 264 of seal segments 256A and connected to the high pressure side of the seal by radial cutouts 263 (FIG. 5).

With reference now to FIG. 2A, it will be seen that an upper shaft sleeve 268 is mounted on shaft 34 and rests on intermediate shaft sleeve 134; it is relatively short in length when compared with the length of sleeve 134. It is positioned opposite the No. 4 seal ring segments 256A to react therewith. The outer surface of the sleeve 268 is finely machined to form a sealing surface for the sealing dam 262 to engage. Rotation of the upper sleeve 268 relative to shaft 34 is prevented by the provision of at least two keying pins 270 extending downwardly from the lower edge of sleeve 268 into complementary openings in the intermediate sleeve 134. The sleeve 268 is prevented from upward movement by a securing sleeve 280 and securing nut 282 which fixes the sleeve 280 relative to shaft 34 by conventional means (not shown). The secondary seal formed between surfaces 264 on the seal ring segments 256A and downwardly facing surface 266 in the recess has its surface precisely machined flat to serve as a sealing surface. The seal ring segments 256A are coupled together by a complementary tongue and recess arrangement 284 and 286, as more particularly described in the aforementioned Stein patent.

As shown in FIG. 2A, each closure cap half-segment 39A and 39B has a semicircular spring support plate 288 secured to it by bolts, such as bolt 290, with the plate 288 co-extending with the lower radial surface of the half-segment 39A and 39B, respectively. Inward movement of each of the segments 256A is stopped by a lug 289 upwardly extending from the spring support plate 288 into a radial slot 291 located on the lower surface of each segment 256A extending from the bore surface 257 thereof and terminating approximately midway into the segment in a radial direction. Each radial slot 291 is positioned on its segment 256A between the two hydroload pockets 258 thereon so that the slot 291 does not interfere with the pockets 258. One lug 289 and one slot 291 are employed for each segment 256A.

Coil springs (not shown) are mounted on each plate 288 and extend upwardly therefrom to be received in axial openings 267 (FIG. 5) in segments 256A to bias the sealing dam 255 into engagement with the sealing surface 266 to effect sealing therebetween. In this example, three coil springs are used with each seal segment 256A so that each semi-circular spring support plate 288 carries nine such coil springs. Thus the No. 4 seal assembly 78 is assembled to form two self-contained subassemblies, each including a closure cap half-section 39A (or 39B), three seal ring segments 256A, one spring support plate 288 having three lugs 289 thereon, nine coil springs for biasing the seal ring segments 256A axially, and nine compression springs for biasing the seal segments 256A radially inwardly toward the shaft sleeve 268.

Operation of the Seal System (Normal and Emergency)

Normal operation of the seal system is such that high pressure is on the outer surface of the No. 1 seal at a level of up to 2500 psi. The No. 1 seal is a hydrostatic seal of the film-riding type, as described, and breaks down the up to 2500 psig pressure to approximately 30–150 psi along the seal gap 93 to the low pressure inner side of the seal ring 82. This pressure is exposed to the outer surface of the seal ring 150 of the No. 2 seal 74. When the shaft 34 is rotating, the high pressure on the outside of the No. 2 seal ring 150 (approximately 50 psi) passes into the Rayleigh pockets in the No. 2 runner insert 140, creating a small but positive seal film in the No. 2 seal gap 170, and the pressure drop across the gap 170 is reduced from 50 psig to approximately 3–6 psig. The latter pressure is then exposed to the low pressure side of the No. 2 seal ring 150, and liquid at that pressure passes into the housing region 224, where it is exposed to the outer, or higher pressure, surface of the No. 3 seal ring 210. When the shaft is rotating, this pressure is broken down by the No. 3 seal and its Rayleigh pockets to approximately 1–2 psig, which pressure extends to the outer periphery of the No. 4 seal assembly 78, where it is totally accommodated by the No. 4 seal 78. Thus the exterior of the seal housing 32 during normal operation does not even have a leakage mist exiting therefrom.

While not described as a part of this invention, it will be seen from FIG. 1B that a plurality of fluid passageways are formed in the seal housing 32, such as the passageway A on the low pressure side of the No. 1 seal for liquid removal, if desired; passageway B for the low pressure side of the No. 2 seal for liquid removal, if desired; and two passageways C for liquid removal and, if desired, liquid injection, respectively, upstream of the No. 3 seal. These passageways are not described further, as they do not play a role in the operation of the seal system of this invention.

In the event that the motor pump unit of this invention is not running and the shaft 34 is stationary, the hydrostatic No. 1 seal 72 will continue to break down the system pressure from up to 2500 psi on the high pressure side to approximately 50 psi on the low pressure side thereof The No. 2 seal, however, being of the hydrodynamic type, will be forced closed by the downward pressure on the No. 2 seal ring 150, moving the sealing dam 180 into engagement with the upper surface of the runner insert 140 to totally shut off any liquid flow across the No. 2 seal. Of course, the secondary piston ring seal 164 concurrently prevents liquid flow thereacross. Since there is no pressure across the No. 3 seal, or at most minimal pressure drop thereacross, the No. 3 and No. 4 seals will also be essentially closed. In the unlikely event of a failure to operate of the No. 1 seal, full pressure may extend through it to the No. 2 seal. The latter seal, even though designed for normal operation with approximately 50–90 psig across it, will take the full pressure and be seated closed if the shaft is stationary, or break down that pressure as a Rayleigh-type seal normally does in the event the shaft 34 is rotating. Similarly, if the shaft 34 is stationary, the No. 3 seal will be seated in its closed position, and the No. 4 seal will be in its closed position by virtue of the resilient forces acting on the seal ring segments. Whatever pressure is not broken down by the No. 2 seal will be broken down by the Rayleigh sealing function of the No. 3 seal, and whatever pressure is not broken down by the No. 3 seal will be accommodated by the No. 4 seal, which will pump the high pressure liquid back into the high pressure housing in accordance with the principles of a hydroload segmented seal.

If, however, the No. 2 seal as well as the No. 1 seal simultaneously fail to operate when the shaft is rotating, then fill system pressure will be across the No. 3 seal, and that seal, although designed normally to break down a small amount of pressure, will break down a significant portion of the full system pressure. The No. 4 seal, which will have a much higher pressure drop across it by virtue of the fact that only the No. 3 seal is breaking down the system pressure upstream of it, will continue to function as a hydroload seal, pumping liquid back into the high pressure region. Even if the pressure drop across it is close to full system pressure, the segments of the No. 4 seal will be moved such that its sealing darn will be in high wear rubbing engagement with the upper sleeve 268 on the shaft 34 and essentially contain the pressure for the time sufficient to permit the entire system to be shut down and depressurized for seal repair and/or replacement. Should the No. 1 and No. 2 seals simultaneously fail to function while the shaft is not rotating, the hydrodynamic No. 3 seal will have full pressure across it, and the sealing dam 245 of the No. 3 seal will be moved into engagement with the upper surface 217 of the No. 3 seal runner 208 to close down the No. 3 seal and accommodate full pressure thereacross. Should the No. 3 seal also become nonfunctional, and full pressure passes across it without substantial pressure drop while the shaft is stationary, the full pressure will be across the No. 4 seal, moving the secondary seal surfaces 264 and 266 into sealing engagement by system pressure. The sealing dam 262 on the seal segments 256A would be in engagement with the outer surface of shaft sleeve 268 to accommodate full system pressure with essentially zero leakage.

Repair and Maintenance of the Seal System

In accordance with this invention, the No. 2, No. 3, and No. 4 seal systems are designed to be removed for maintenance, repair, and/or replacement as subassemblies in a manner in which the motor 29 need not be removed from the pump 14. More particularly, in the event scheduled maintenance or unscheduled repair is desired, and the reactor system is shut down and cooled down, access to the seals may be had through the opening 50 in the motor support housing 40. Specifically, when the bolts 60 are removed, the removable shaft coupling device 58 can be withdrawn through the opening 50 to expose the upper end of the shaft 34. If the shaft sleeves 280, 268, and 134 are of sufficient diameter to receive the lower flange 56 in the sleeve openings, the lower flange 56 need not be removed from the upper end of the pump shaft 34. If, however, the flange 56 cannot be received in the openings of the aforementioned shaft sleeves, then flange 56 must be removed. The distance between flange 54 and flange 56 (i.e., the length of the coupling device 58) is maximized in order to permit the various shaft sleeves and housing parts to pass between the free ends of the motor shaft 52 and pump shaft 34. However, when a new and longer shaft seal system is applied to existing motor pump units, it is too expensive to raise the motor unit higher above the pump and to replace or enlarge the motor support 40 and the coupling device 58. Accordingly, for existing motor pump units, it may be necessary to use an additional shaft sleeve, such as the upper sleeve 268. Thus for certain motor pumps, the longest length component that can pass laterally between the motor shaft 52 and its flange 54 and the top of the pump shaft 34 may be the intermediate shaft sleeve 134; because of that, an upper sleeve 268 may be required to backfit existing motor pump units with the No. 4 seal of this invention. If that is not necessary, then the intermediate sleeve 134 could be lengthened to extend all the way to the securing sleeve 280 rather than be extended by a separate sleeve 268. All of the housing parts in this example that are removed are shorter in length than the intermediate shaft sleeve 134 and can be removed without lifting the motor 29.

To remove the No. 4 seal, first the securing nut 282 and sleeve 280 are removed Then the sleeve 268 is removed. Next the bolts 64 which secure the closure cap 39 to the housing segment 37 are removed, and the No. 4 seal assembly 78 can now be lifted as a unit upwardly over the upper end of the pump shaft 34, and then laterally between the upper end of the pump shaft 34 and the lower end flange 54 of the motor 29 and out through opening 50 of motor support 40. It is also possible to remove the closure cap 39, including the No. 4 seal assembly 78, concurrently with the sleeve 268 (after removal of the securing nut 282, sleeve 280, and bolts 64). Then the Nos. 2 and 3 seals can be removed in a single lift, and the No. 1 seal ring can be removed in a separate lift, as will be described.

Should it be desirable just to inspect the No. 4 seal system 78 or just to replace the segments 256A of the No. 4 seal, this can be achieved, in accordance with this invention, without detachment or removal of the shaft coupling 58. It is necessary to remove only cap bolts 64, the taper alignment pins 69, and the side bolts 70 in flanges 68 of closure cap 39 to separate the two cap half-sections 39A and 39B. Then the closure cap 39 can be lifted slightly above the complementary shoulders 250, and one of the No. 4 seal subassemblies contained within one of the closure cap half-sections such as 39A will then be separable from the No. 4 seal subassembly contained in the other half-section 39B. All components of the No. 4 seal, including the seal segments 256A, can be removed as two subassemblies without removing the shaft coupling device 58, sleeve 268, or the securing nut 282 and sleeve 280.

For normal maintenance, however, the No. 4 seal assembly 78 is removable either by separating the two half-sections of the closure cap 39, as described above, before or after the removal of the sleeve 268, or concurrently with the removal of the upper sleeve 268 of the closure cap without separating the half-sections 39A and 39B. The preferred embodiment of this invention is to remove the sleeve 268 first and then separate the two subassemblies contained within the closure cap 39, thereby removing each subassembly separately.

During normal maintenance, seal inspection and/or replacement includes the No. 2 and No. 3 seals. After the No. 4 seal has been removed, the No. 2 and No. 3 seals are removed as a unit by a single lift, as follows. First, bolts 63, which connect the housing segments 35 and 37 to housing segment 33, are unthreaded and removed through the motor support opening 50. The shaft sleeve 134 is then engaged by an appropriate lifting tool and is lifted up over the upper end of the pump shaft 34, carrying with it the lock nut 142 and the locking cup 144, the No. 3 seal assembly 76, the No. 2 housing segment 35, the housing segment 37, and the No. 2 seal assembly 74 as a single unit. If desired, the No. 1 seal support member 102, which is now exposed through the top of the lower housing segment 33, can be lifted as a unit, carrying with it the No. 1 seal ring 82 by interaction between the outer ring 132 thereon and the shoulder at the bottom of recess 130 in seal support member 102. Inspection of the No. 2 and No. 3 seals and, if desired, the No. 1 seal ring 82, can be performed at that time, or substitute subassemblies may be inserted into the seal housing 32, so that inspection of the seal units may be performed at a later time and the pump placed back into service more quickly. The No. 1 seal ring and the Nos. 2, 3, and 4 seal systems (or the No. 4 seal alone) may be reassembled and the seal housing closed by reversing the sequence of steps.

It will be understood that the diameter of shaft 34 for motor pump units for reactor applications may be on the order of seven or eight inches. It will also be understood that the motor pump unit of this invention, which has a new and improved seal system as hereinabove described, provides for essentially every contingency to ensure that a safe, non-leaking seal system is provided for the unit and where the repair and replacement of the seals may be accomplished with a minimum of system down time. Further, many aspects of the components of this invention are related but also may be used separately; together they synergistically merge to create a reliable operating system and combination of parts. While components of this invention may be used separately or together without departing from the broad spirit and scope thereof, it is intended that the specific embodiment be interpreted as broadly as is permitted by the prior art and not in a limiting sense.

What is claimed is:

1. For a closed system for containing liquid operating at elevated pressures in excess of 1000 psi, a sealing system for a pump having a stationary housing with highly pressurized liquid therein and having an inlet section exposed to high pressure and an outlet section exposed to lower pressure and a shaft in said housing with a rotational axis, said sealing system including a primary pressure breakdown sealing arrangement and a back-up pressure breakdown sealing arrangement disposed in series in the direction of fluid flow from said inlet to said outlet of said housing, each of said sealing arrangements forming a seal gap between a rotatable component thereof and a relatively stationary component thereof, each sealing arrangement sealably mounting said shaft relative to said housing, said primary sealing arrangement comprising a radially extending seal runner, rotatable with said shaft, having a radially extending annular runner seal face thereon, an axially movable relatively stationary sealing ring encircling said shaft, and a ring sealing face thereon confronting said runner seal face, respectively, a secondary seal being sealably mounting said seal ring relative to said housing except along the seal gap formed between said ring sealing face and said runner seal face;

said primary sealing arrangement being positioned between said shaft and said housing such that the higher pressure liquid passes from said housing inlet to the one end of its seal gap which is exposed to higher pressure and along said seal gap to the other end thereof where the pressure has normally been broken down to lower pressure, and said back-up sealing arrangement being positioned between said shaft and said housing such that said other end of the seal gap of the primary sealing arrangement is in flow communication with the higher pressure end of the seal gap of said back-up sealing arrangement;

said primary sealing arrangement being of the hydrostatic type and formed to have a limited but finite leakage flow through the seal gap and wherein fluid pressure is broken down along its seal gap irrespective of the rotation of said shaft, said back-up sealing arrangement being of the hydrodynamic type wherein the pressure across its seal gap is broken down to effect pressure breakdown between said shaft and said housing only when said shaft is rotating, and said backup sealing arrangement being shaped so that its seal gap is closed when said shaft is not rotating to prevent any leakage across the seal gap thereof unless said shaft is rotating.

2. The sealing system of claim 1, wherein said secondary seal of said primary sealing arrangement comprises an axially split unitary piston ring having an overlapping leakage minimizing tongue and groove at the split and spring loaded into sealing engagement with both the seal ring of said primary sealing arrangement and said housing.

3. The sealing system of claim 1, wherein said backup hydrodynamic sealing arrangement has a radially extending seal runner, rotatable with said shaft, having a radially extending annular runner seal face thereon, an axially movable relatively stationary sealing ring encircling said shaft, and a ring sealing face thereon confronting said runner seal face, respectively, a secondary seal being sealably mounting said seal ring relative to said housing except along the seal gap formed between said ring sealing face and said runner seal face, and having Rayleigh pockets along the seal gap thereof, wherein the Rayleigh pockets are formed in the seal runner, and wherein a sealing dam for the backup sealing arrangement is formed on a face of the seal ring forming the seal gap.

4. The sealing system of claim 3, where said a secondary sealing arrangement of said backup sealing arrangement comprises an axially split unitary piston ring having an overlapping leakage minimizing tongue and groove at the split and spring loaded into sealing engagement with both the seal ring of said primary sealing arrangement and said housing.

5. The sealing system of claim 3, wherein said Rayleigh pockets are located on an annular horizontal surface of said backup seal runner, and wherein said seal gap has one end thereof located in a higher pressure region than the housing region at the other end of said seal gap, said backup seal runner having spaced passageways therein open to the region of said housing adjacent said other end of said backup seal gap and having additional spaced passageways therein open to the region of said housing adjacent said one end said backup seal gap, whereby said high pressure and said low pressure passageways cooperate to prevent rotation of said backup seal runner relative to the centroid thereof, thereby maintaining said annular horizontal surface horizontal when a pressure differential is thereacross.

6. The sealing arrangement of claim 3, wherein the backup sealing arrangement has an insert located in the seal runner along the seal gap thereof, wherein Rayleigh pockets are formed on said insert and are exposed to the seal gap, and wherein said insert is formed from a relatively harder material than the material forming the seal gap on the seal ring.

7. The sealing arrangement of claim 6, wherein said backup sealing arrangement has an insert formed in the seal ring, which insert has a surface thereon exposed to a portion of the seal gap and wherein said insert is made from a relatively softer material than the material forming the seal runner insert.

8. The sealing arrangement of claim 7, wherein the backup seal runner insert is formed from silicon nitride, wherein the backup seal ring insert is formed from a carbon-graphite material, and wherein the sealing dam is formed on the seal ring insert.

9. The sealing arrangement of claim 3, wherein the backup sealing arrangement includes a plurality of circumferentially spaced Rayleigh pockets along the seal gap, wherein the Rayleigh pockets are formed to be upwardly facing and located in the seal runner, and wherein a pumping groove extends from each Rayleigh pocket downwardly through the runner and inwardly toward the shaft to provide liquid feed to the Rayleigh pockets.

10. The sealing arrangement of claim 1, wherein a second backup sealing arrangement is provided and wherein the second backup sealing arrangement is a normally closed hydrodynamic seal forming a normally closed seal gap located in fluid communication with the low pressure side of the seal gap of the primary sealing arrangement.

11. The sealing arrangement of claim 10, wherein said shaft has a removable sleeve mounted thereon for rotation therewith, and wherein said backup and said second backup sealing arrangements are mounted on said sleeve and removable from said housing with the removal of said sleeve.

12. The sealing arrangement of claim 10, wherein the second backup sealing arrangement includes a plurality of circumferentially spaced Rayleigh pockets along the seal gap, wherein said Rayleigh pockets are upwardly facing and located in the seal runner of the second backup sealing arrangement, and wherein a plurality of pumping grooves extends from each Rayleigh pocket through the seal runner in a downward and an inward direction toward the shaft and opening into the housing region upstream of the last mentioned seal gap.

13. The sealing arrangement of claim 10, wherein a hydrodynamic rubbing shutdown seal is provided downstream of the second backup sealing arrangement and in fluid communication with the seal gap thereof, said shutdown seal comprising a segmented seal having a bore surface of each segment surrounding said shaft and having pumping grooves in said bore surface of each of said segments pumping liquid outwardly from said grooves back into said housing toward said second backup sealing arrangement, each of said seal ring segments being biased into engagement with said shaft and each of said seal ring segments having a secondary sealing surface thereon biased into engagement with a complementary sealing surface on said housing, and wherein the surfaces of said seal ring segments opposite the bore surface thereof and opposite the secondary sealing surface are exposed to higher pressure so that upon malfunction of at least one of the primary and backup sealing arrangements where high pressure is not being substantially broken down, such high pressure is on said last-mentioned surfaces of said seal ring segments, which forces the bore surface of said seal ring segments into sealing engagement with said shaft and said secondary sealing surface of said segments into rubbing engagement with said complementary sealing surface on said housing.

14. The sealing arrangement of claim 13, wherein said shutdown seal is formed from two semi-circular subassemblies joined together at confronting axially extending surfaces and having pins coupling said subassemblies for aligning them in the axial direction and securing devices for securing the subassemblies together.

15. For a closed system containing liquid operating and elevated pressures in excess of 1000 psi, a sealing system for a stationary housing with highly pressurized liquid therein, having an inlet section exposed to high pressure, an outlet section exposed to lower pressure, and a shaft in said housing with a rotational axis, said sealing system including a hydrostatic-type primary pressure breakdown sealing arrangement and a normally closed hydrodynamic-type backup pressure breakdown sealing arrangement disposed in series in the direction of fluid flow from said inlet to said outlet of said housing, each sealing arrangement sealably mounting said shaft relative to said housing, said primary sealing arrangement comprising a radially extending seal runner rotatable with said shaft having a radially extending annular runner seal face therein, an axially movable sealing ring encircling said shaft, and a ring sealing face thereon confronting said runner seal face, said seal ring having a secondary seal sealably mounted mounting said seal ring relative to said housing except along the seal gap formed between said ring sealing face and said runner sealing face, said primary sealing arrangement being positioned between said shaft and said housing such that the higher pressure liquid passes from the housing inlet to one end of said seal gap which is exposed to the one end of said seal gap which is exposed to higher pressure and along said seal gap to the other end thereof wherein the pressure has normally been broken down to lower pressure, and said backup sealing arrangement being positioned between said shaft and said housing such that the other end of said seal gap of the primary sealing arrangement is in flow communication with the higher pressure end of the seal gap of said backup sealing arrangement, said backup sealing arrangement comprising a segmented seal having a bore surface of each segment surrounding said shaft and having pumping grooves in said bore surface of each of said segments pumping liquid outwardly from said grooves back into said housing toward said primary sealing arrangement, each of said seal ring segments being biased into engagement with said shaft and each of said seal ring segments having a secondary sealing surface thereon biased into engagement with a complementary sealing surface on said housing and wherein the surfaces of said seal ring segments opposite the bore surface thereof and opposite the secondary sealing surface are exposed to higher pressure so that upon malfunction of the primary seal wherein high system pressure is not substantially broken down by said primary sealing arrangement, such high pressure is on said last-mentioned surfaces of said seal ring segments, which forces the bore surface of said seal ring segments into sealing engagement with said shaft and said secondary sealing surface of said segments into sealing engagement with said complementary sealing surface on said housing.

16. The sealing system of claim 15, wherein said outlet section of said housing has said shaft passing through an opening therein, wherein said housing has an axially split ring-shaped closure cap forming two half-sections mounted on said outlet section thereof and having said shaft passing therethrough and closely received within the opening of said closure cap, securing devices sealingly securing said closure cap to said housing outlet section and additional securing the two half-sections of said closure cap together, alignment pins coupled to and axially aligning the two-half of said closure cap relative to each other, said closure cap forming an annular recess therein surrounding said shaft and exposed to the interior of said housing, said seal ring segments being located in said closure cap, said complementary sealing surface on said housing being an annular surface within said recess which surrounds said shaft, each of said half-sections of said closure cap having a half-ring located opposite and spaced from said complementary surface therein, said seal ring segments being positioned between said complementary surface and said half-ring, and a cooperating lug and slot on said half-ring and each of said seal segments to stop movement of said segments toward said shaft, whereby said half-sections can be separately removed from said housing at the split therebetween to facilitate seal replacement.

* * * * *